(12) United States Patent
Wagner et al.

(10) Patent No.: US 10,374,520 B2
(45) Date of Patent: Aug. 6, 2019

(54) CONTROL CIRCUIT AND METHOD FOR CONTROLLING A RESONANT CONVERTER AND POWER INVERTER COMPRISING THE RESONANT CONVERTER AND THE CONTROL CIRCUIT

(71) Applicant: KONINKLIJKE PHILIPS N.V., Eindhoven (NL)

(72) Inventors: Bernhard Wagner, Hamburg (DE); Yuhang Cui, Shenyang (CN); Jilong Han, Shenyang (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/062,276

(22) PCT Filed: Dec. 16, 2016

(86) PCT No.: PCT/EP2016/081573
§ 371 (c)(1),
(2) Date: Jun. 14, 2018

(87) PCT Pub. No.: WO2017/103201
PCT Pub. Date: Jun. 22, 2017

(65) Prior Publication Data
US 2018/0375436 A1    Dec. 27, 2018

(30) Foreign Application Priority Data
Mar. 7, 2016  (EP) ..................................... 16158883

(51) Int. Cl.
*H02M 7/48*    (2007.01)
*H02M 3/337*    (2006.01)
*H02M 3/335*    (2006.01)
*H02M 7/5387*    (2007.01)
*H05G 1/20*    (2006.01)
*H05G 1/32*    (2006.01)
*H05G 1/34*    (2006.01)
*H02M 1/00*    (2006.01)

(52) U.S. Cl.
CPC ......... *H02M 3/3376* (2013.01); *H02M 3/337* (2013.01); *H02M 3/33523* (2013.01);
(Continued)

(58) Field of Classification Search
CPC ....... H02M 2007/4815; H02M 1/4241; H02M 2007/4818; H02M 7/523
(Continued)

(56) References Cited

U.S. PATENT DOCUMENTS 4,864,479 A    9/1989  Steigerwald
5,267,138 A    11/1993  Shores
(Continued)

FOREIGN PATENT DOCUMENTS

CN    103441692 A    12/2013

*Primary Examiner* — Alex Torres-Rivera
(74) *Attorney, Agent, or Firm* — Larry Liberchuk

(57) ABSTRACT

The present invention proposes a control circuit and a method of controlling a resonant converter comprising a full-bridge configuration in the following manner: during each half period of a plurality of periods of a resonant current of the resonant converter, starting from an initial state (500) in which a diagonal pair are conductive, turning off (510) a first switch member of the diagonal pair on the basis of the voltage control signal; turning on (520), after the turn-off of the first switch member, a switch member in series connection with the first switch member prior to a zero crossing (E5) of the resonant current; turning off (530), after the turn-off of the first switch member, a second switch member of the diagonal pair prior to the zero crossing (ES); and turning on (540), after the turn-off of the second switch member, a switch member in series connection with the second switch member prior to the zero crossing event of the resonant current.

14 Claims, 17 Drawing Sheets

(52) U.S. Cl.
CPC ..... *H02M 3/33569* (2013.01); *H02M 7/5387* (2013.01); *H05G 1/20* (2013.01); *H05G 1/32* (2013.01); *H05G 1/34* (2013.01); *H02M 2001/0058* (2013.01); *H02M 2007/4815* (2013.01); *Y02B 70/1433* (2013.01); *Y02B 70/1491* (2013.01); *Y02P 80/112* (2015.11)

(58) Field of Classification Search
USPC ............................................ 363/21.02, 21.03
See application file for complete search history.

(56) References Cited

U.S. PATENT DOCUMENTS

| | | |
|---|---|---|
| 5,719,759 A | 2/1998 | Wagner |
| 6,124,581 A * | 9/2000 | Ulrich .................... H05B 6/08 |
| | | 219/626 |
| 6,178,099 B1 | 1/2001 | Schutten |
| 6,324,080 B1 | 11/2001 | Laeuffer |
| 6,683,800 B2 * | 1/2004 | Loef ...................... H02M 3/337 |
| | | 363/17 |
| 2011/0007528 A1 | 1/2011 | Scheel |
| 2011/0080991 A1 | 4/2011 | Scheel |
| 2011/0222326 A1 * | 9/2011 | Gray ................. H02M 7/53875 |
| | | 363/132 |
| 2011/0222651 A1 | 9/2011 | Ogawa |
| 2011/0261593 A1 * | 10/2011 | Pan ....................... H02M 3/337 |
| | | 363/21.02 |
| 2015/0131336 A1 * | 5/2015 | Choi ................... H02M 3/3353 |
| | | 363/21.02 |
| 2015/0155788 A1 | 7/2015 | Wagner |
| 2015/0236600 A1 | 8/2015 | Waffler |

* cited by examiner

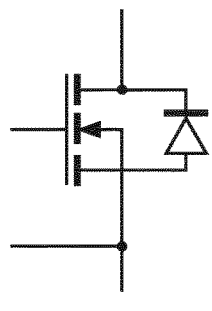 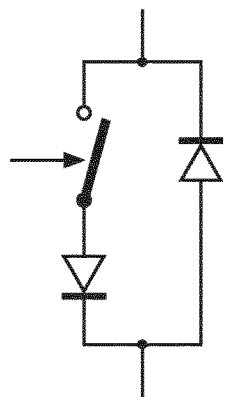 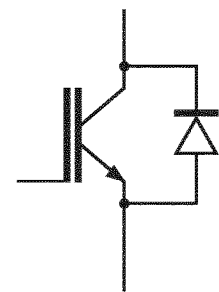
FIG. 2A  FIG. 2B  FIG. 2C
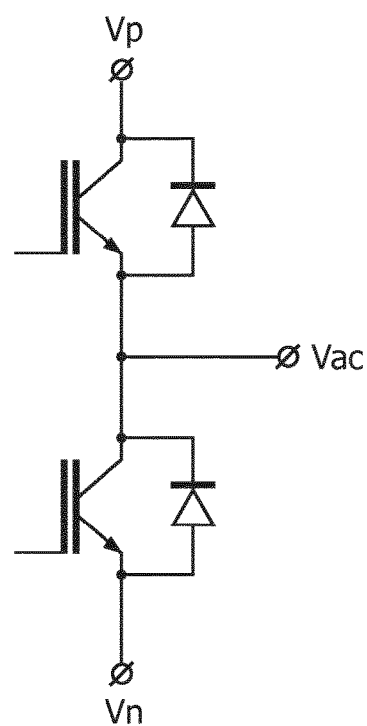
FIG. 3

CONTROL CIRCUIT AND METHOD FOR CONTROLLING A RESONANT CONVERTER AND POWER INVERTER COMPRISING THE RESONANT CONVERTER AND THE CONTROL CIRCUIT

FIELD OF THE INVENTION

The present invention relates to a resonant converter, particularly to a control circuit and a method for controlling the resonant converter.

BACKGROUND OF THE INVENTION

For the high-voltage source of X-ray generators, a resonant converter in full-bridge (i.e. H-bridge) configuration has turned out to be a useful topology. More generally, the resonant converter in full-bridge configuration is capable of converting a DC current into an AC current or vice versa, and thus it can be used as a power inverter or a controllable rectifier.

FIG. 1 illustrates an exemplary high-voltage source comprising a resonant converter in full-bridge configuration. The full-bridge configuration comprises two parallel switching branches (also called half-bridges or switching legs): one comprises two series-connected switch members S1 and S2, and the other comprises two series-connected switch members S3 and S4. Each switch can be any suitable type of power semiconductor device and is exemplarily illustrated as an IGBT transistor with a reverse conducting diode in FIG. 1. A current is conducted on average between the DC voltage source $V_{dc\_in}$ and the full-bridge. A DC-link capacitor C_in or a set of those capacitors may be used to conduct AC components of the inverter input current in order to smooth the DC voltage across the switching legs. A resonant circuit is connected in series with a transfer former primary (low-voltage) winding of a transformer T between the junctions A and B of the switch members in each of the switching branches. A resonant load circuit, also called resonant tank, can be driven by the full-bridge inverter. For example, it can be a series resonant circuit (i.e. a LC circuit) or an LCC circuit. Other combinations of resonant elements are possible. For example, the capacitor C_res, the inductor L_res, and the inherent parasitic capacitance C_p which arises from the secondary (high-voltage) winding of the transformer T, form the LCC circuit. The switching events of the full-bridge are controlled by 110, 112, 114, 116 of a control circuit (not shown) so as to convert a DC link voltage to an AC voltage V_tank which drives the resonant circuit. The arising AC current is then transformed to a high-voltage level by the transformer T, and is then rectified and smoothed by an output capacitor C_out. The inherent parasitic transformer capacitance C_p creates favorable conditions during current commutation and may be used to boost the output voltage. The output voltage can be supplied to any kind of load L, such as an X-ray tube.

There exist several control schemes for controlling the switching events of the full-bridge. The main objective is to define a scheme which enables a high operating frequency in order to reduce the ripple of the output voltage and to minimize the cost and size of components. This can only be reached if the power semiconductor losses can be minimized by means of zero voltage switching (ZVS) and zero current switching (ZCS). ZVS may be supported by use of snubber capacitors Cs1 . . . Cs4, which are connected in parallel to the switching devices, respectively, as seen in FIG. 1. Furthermore, they help to relieve electromagnetic interference and reduce earth leakage currents.

A well-known control scheme is pulse frequency modulation (PFM). This means that the transferred output power depends on the controlled operating frequency of the inverter. The most often used control method is operation with variable frequency in a range which is located above the series resonant frequency of the main reactive elements L_res and C_res according to the circuitry in FIG. 1. This control generally requires wide frequency variation in order to cover a range of operation from no load to full load. Furthermore, there are operational states in which the power is fed back from the resonant reactances to the DC input capacitor C_in. This power feedback is active when a diagonal pair of diodes, either D1 and D4, or D2 and D3, conduct a current. Consequently, the drawbacks of the existing PFM control technique are larger size and lower efficiency.

Other control schemes, such as pulse width modulation (PWM, see U.S. Pat. No. 5,719,759A), apply both kinds of hard switching events (turn-off and turn-on) to any semiconductor switch, which makes it difficult to use a simple snubber circuit such as a snubber capacitor. Hard switching events cause high levels of switching losses and thus limit the operation frequency according to the heat dissipation capabilities of the semiconductor devices.

Another control scheme called phase shift control (see US2011222651, U.S. Pat. No. 6,178,099B1) uses different modes at different power ranges. The leading leg half-bridge and the lagged leg operate with different switching actions. Under light-load or no-load condition, the ZVS condition is no longer present. At high power, the ZCS condition is difficult to keep. Thus, there are operating points where the phase shift switching method does not work in soft switching. Switching losses become significant there and lead to an undesired cooling effort or even to over temperature of the devices.

SUMMARY OF THE INVENTION

Therefore, it would be advantageous to provide a novel control scheme for the resonant converter.

In accordance with an embodiment of a first aspect of the present invention, there is proposed a control circuit for controlling a resonant converter comprising a full-bridge configuration. The full-bridge configuration comprises two parallel switching branches. Each of the two switching branches comprises two series-connected switch members. A switch member of one switching branch and a respective member of the other switching branch form a diagonal pair. The control circuit comprises:

an output voltage controller for providing a voltage control signal for controlling an output voltage of the resonant converter;

a switch encoder for controlling switching events of the switch members;

wherein the switch encoder is configured, during each half period of a plurality of periods of a resonant current of the resonant converter, starting from an initial state in which a diagonal pair are conductive, to turn off a first switch member of the diagonal pair on the basis of the voltage control signal;

turn on, after the turn-off of the first switch member, a switch member in series connection with the first switch member prior to a zero crossing of the resonant current, on the basis of the zero crossing event;

turn off, after the turn-off of the first switch member, a second switch member of the diagonal pair prior to the zero crossing, on the basis of the zero crossing event; and turn on, after the turn-off of the second switch member, a switch member in series connection with the second switch member prior to the zero crossing event of the resonant current, on the basis of the zero crossing event.

Completely different from the existing control scheme, the proposed control circuit is capable of controlling the switching events within one cycle of a half period of the resonant current. The period of the resonant current is also called resonant period. Specially, it is proposed that starting from an initial state in which a diagonal pair of switch members are conductive, the two initially conductive switch members are turned off and the other two initially non-conductive switch members are turned on during one half period of the resonant period. None of the existing control schemes uses this novel switching sequence.

By means of the proposed control scheme, all turn-on switching events are lossless. Specially, the switch member in series connection with the first switch member is turned on after the turn-off of the first switch member. For brevity, one switch member of the two series-connected switch members (i.e. the two switch members of the same branch) is also called the complementary switch member of the other switch member hereinafter. After the first switch member is turned off, the diode of the complementary switch member of the first switch member becomes conductive and the resonant current flows through the complementary switch member in a direction opposite to the driving DC-link voltage across the bridge leg. Consequently, the complementary switch member is turned on at a negative current or, in other words, when its diode is conductive, and thus such turn-on event is a ZCS event and lossless. Similarly, the switch member in series connection with the second switch member is also turned on after the turn-off of the second switch member; such turn-on event is also lossless.

In accordance with an embodiment, the control circuit further comprises a zero crossing predictor for providing a zero crossing predicting signal indicating zero crossing predicting events of the resonant current, each zero crossing predicting event leading a respective zero crossing of the resonant current by a predetermined advancing time interval; and the switch encoder is further configured to turn off the second switch member at a zero crossing predicting event on the basis of the zero crossing predicting signal.

The predetermined advancing time interval is a relatively small time interval. Preferably, the predetermined advancing time can be 5% to 15% of the resonant period. In this way, it is proposed to turn off the second switch member at a time point closer to the zero crossing of the resonant current. Since the second switch member is turned off at a zero crossing predicting event, the second switch member is turned off at a small resonant current, and thus the turn-off switching loss is also low. Generally, the smaller the predetermined advancing time, the smaller the resonant current at the zero crossing predicting event becomes, and the lower the switching loss becomes.

In accordance with an embodiment, the switch encoder is further configured to turn on the switch member in series connection with the first switch member on the basis of the zero crossing predicting signal. In an example, the switch member in series connection with the first switch member, namely the complementary switch member of the first switch member, can be turned on at a zero crossing predicting event. In another example, the complementary switch member of the first switch member can be turned on adjacent to a zero crossing predicting event, either leading or lagging the zero crossing predicting event by a certain predetermined time interval.

In accordance with an embodiment, the control circuit further comprises a first delay unit for providing a first delayed signal indicating delayed zero crossing-predicting events, each delayed zero crossing-predicting event lagging a corresponding zero crossing-predicting event by a first predetermined delay time and being prior to a corresponding zero crossing of the resonant current; and the switch encoder is further configured to turn off the switch member in series connection with the second switch member at a delayed zero crossing predicting event on the basis of the first delayed signal.

In this way, the second switch member is turned off at a zero crossing predicting event, and the complementary switch member of the second switch member is turned on at a point of time which is delayed to the zero crossing predicting event, however before the zero crossing event. Preferably, the first predetermined delay time is set to be equal to or greater than the dead time of the switch member. In this way, the control signals of a half-bridge at least contain the dead time between the turn-off trigger for one switch member of the half-bridge and the turn-on trigger for the complementary switch member. The dead time ensures that one switch member is completely turned-off before the complementary switch member becomes conductive. In other words, the dead time prevents simultaneous turn-on states of both of the semiconductor power switches, which would mean a temporary short circuit of the DC-link voltage.

In accordance with an embodiment, the first delay unit is configured to provide the first delayed signal by delaying the zero crossing predicting signal.

In accordance with an embodiment, the switch encoder is further configured to turn on the switch member in series connection with the first switch member at a delayed zero crossing predicting event on the basis of the first delayed signal. In this way, both the complementary switch member of the first switch member and the complementary switch member of the second switch member are turned on at a delayed zero crossing predicting event but still prior to the zero crossing of the resonant current.

In accordance with an embodiment, the control circuit further comprises a second delay unit for providing a second delayed signal indicating events which lag the turn-off of the first switch member by a second predetermined delay time and which are prior to the zero crossing event; and the switch encoder is further configured to turn on the switch member in series connection with the first switch member on the basis of the second delayed signal. In this way, the turn-on of the complementary switch member of the first switch member lags the turn-off of the first switch member by the second predetermined delay time. Preferably, the second predetermined delay time is set to be equal to or greater than the dead time of the switch member.

In accordance with an embodiment, the second delay unit is configured to provide the second delayed signal by delaying the voltage control signal.

In accordance with an embodiment, the switch member first turned off on the basis of the voltage control signal in a first period of the resonant current is different from the switch member first turned off on the basis of the voltage control signal in a second period of the resonant current different from the first period. In accordance with the proposed switching sequence, the two initially conductive diagonal pairs are sequentially turned off during a half resonant period, and then the complementary switches to the aforementioned conductive switches are turned on during the next half resonant period. The switch member turned off at an earlier time (called leading switch member), namely the switch member turned off on the basis of the voltage control signal, suffers from higher switching losses compared to the switch member turned off at a later time (called lagging switch member). By letting one switch member of a diagonal pair be the leading switch member in one resonant period and the other switch member be the leading switch member in another resonant period, the switching losses can be uniformly distributed to all four switch members.

The alternation of the leading switch member of each diagonal pair can be implemented in various ways. In an example, the change or alternation of the leading switch member can be every other resonant period. That is, during a plurality of consecutive resonant periods, the two switch members of a given diagonal pair alternately serve as the leading switch member (i.e. the switch member first turned off on the basis of the voltage control signal). For example, one switch member of a diagonal pair serves as the leading switch member in the first, third consecutive resonant periods, and the other switch member of the diagonal pair serves as the leading switch member in the second, fourth consecutive resonant periods. In another example, the change or alternation of the leading switch member can be every predetermined number of resonant periods, e.g. two, three, etc. Furthermore, the change or alternation of the leading switch for one diagonal pair can be the same or different from that for the other diagonal pair.

The switch encoder can be implemented in a discrete analog circuit, a discrete digital circuit, such as digital signal processing or programmable logic, or a combination thereof.

In accordance with an embodiment, the switch encoder comprises: a synchronous sawtooth generator for providing a sawtooth signal on the basis of the zero crossing predicting signal; a comparator for providing a phase signal on the basis of the voltage control signal and the sawtooth signal; and a digital encoder for providing a drive signal for each switch member on the basis of the phase signal.

In accordance with an embodiment, there is provided a synchronizing signal generator for providing a synchronizing signal on the basis of the zero crossing predicting signal and the zero crossings of the resonant current; a counter for providing a phase signal on the basis of the voltage control signal and the synchronizing signal; and a digital encoder for providing a drive signal for each switch member on the basis of the phase signal.

In accordance with an embodiment of a second aspect of the present invention, there is proposed a method of controlling a resonant converter comprising a full-bridge configuration. The full-bridge configuration comprises two parallel switching branches. Each of the two switching branches comprises two series-connected switch members. A switch member of one switching branch and a respective member of the other switching branch form a diagonal pair. The method comprises: during each half period of a plurality of periods of a resonant current of the resonant converter, starting from an initial state in which a diagonal pair is conductive, turning off a first switch member of the diagonal pair on the basis of the voltage control signal;

turning on, after the turn-off of the first switch member, a switch member in series connection with the first switch member prior to a zero crossing of the resonant current;

turning off, after the turn-off of the first switch member, a second switch member of the diagonal pair prior to the zero crossing; and turning on, after the turn-off of the second switch member, a switch member in series connection with the second switch member prior to the zero crossing event of the resonant current.

In accordance with an embodiment of a third aspect of the present invention, there is proposed a power inverter. The power inverter comprises a resonant converter and the control circuit for controlling the resonant converter, wherein the resonant converter comprises a full-bridge configuration and a resonant circuit. The full-bridge configuration comprises two parallel switching branches, each of the two switching branches comprising two series-connected switch members, a switch member of one switching branch and a respective member of the other switching branch forming a diagonal pair. The resonant circuit is connected between junctions of the two series-connected switch members of each of the two switching branches.

In accordance with an embodiment, one or more of the switch members are in parallel connection to a snubber capacitor. The snubber capacitor is useful for reducing the loss of a turn-off switching event but known to increase the loss of a turn-on switching event. Thanks to the fact that all turn-on switching events occur at a negative current and thus are lossless, a simple snubber capacitor can very suitably be used to reduce turn-off switching losses.

In accordance with an embodiment of a fourth aspect of the present invention, there is proposed an x-ray generator. The x-ray generator comprises: a power inverter; a DC voltage source connected to an input of the power inverter; and an x-ray tube connected to an output of the power inverter.

In addition to said x-ray generator, the proposed power inverter is also applicable for various fields including welding, industrial inductive heating, or electrostatic precipitators for flue gas cleaning.

Other objects and advantages of the present invention will become more apparent and can be easily understood with reference to the description made in combination with the accompanying drawings.

DESCRIPTION OF THE DRAWINGS

The present invention will be described and explained hereinafter in more detail in combination with embodiments and with reference to the drawings, wherein:

FIG. 2A, FIG. 2B and FIG. 2C illustrate exemplary switch members;

FIG. 3 illustrates an exemplary half bridge;

Figure 1:
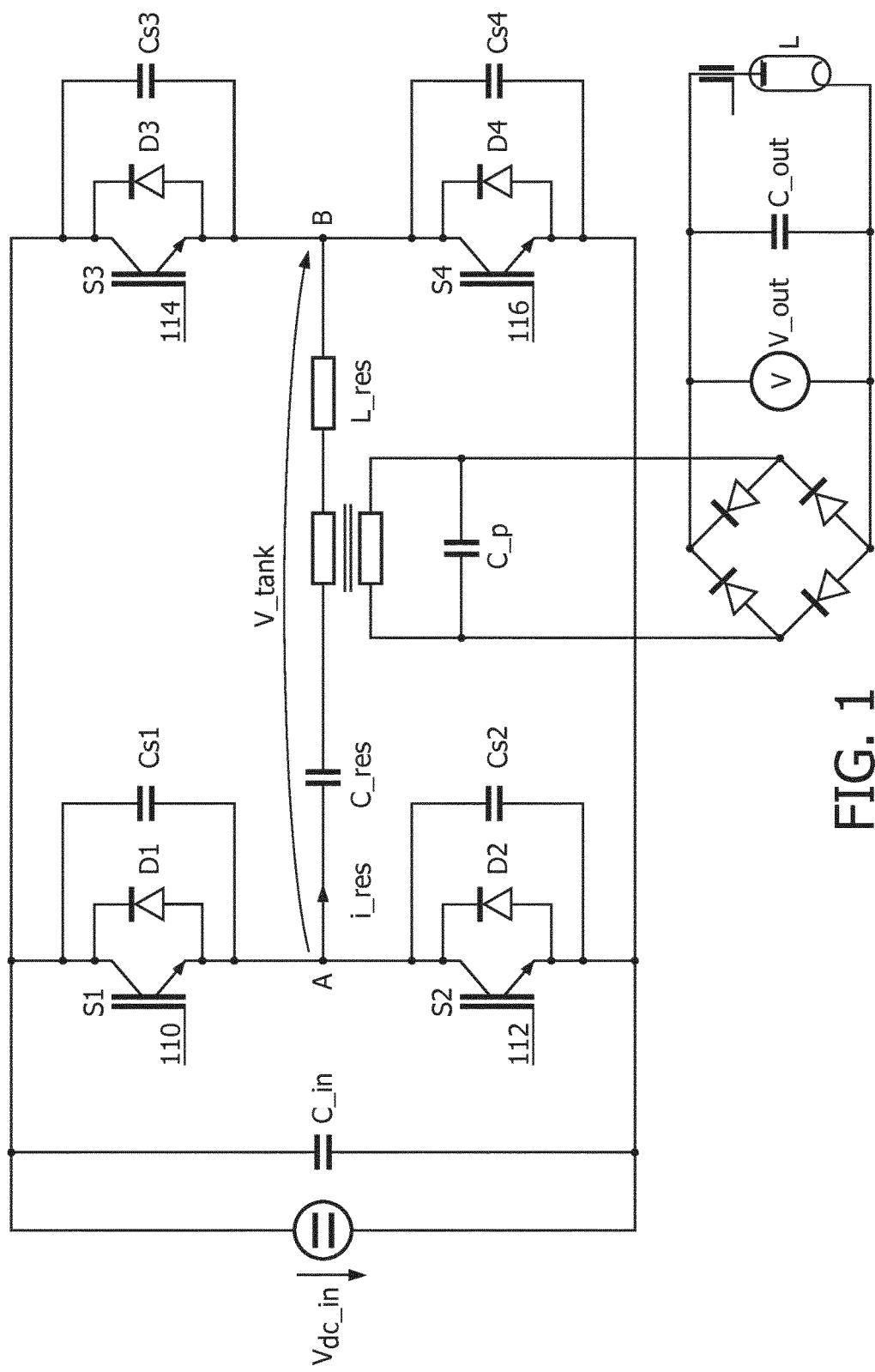
FIG. 1 illustrates an exemplary high-voltage source comprising a resonant converter in full-bridge configuration according to the prior art.

The same reference signs in the figures indicate similar or corresponding features and/or functionalities.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Firstly, some well-known terms are briefly described with reference to FIG. 2A, FIG. 2B, FIG. 2C, FIG. 3 and FIG. 4.

A switch member denotes a combination which comprises one or more parallel and/or series-connected switches (for example, an IGBT, a MOS transistor, or another semiconductor switch) and a reverse diode which is connected parallel to the one or more switches or which can be found, performing an intrinsic function, as the body diode of a MOSFET. In general, a switch member can be functionally represented by two elementary components connected parallel to each other:

a power switch, comprising one or more parallel and/or series-connected switches, which can be turned on and off by an external signal and which blocks a voltage in the turned-off state and which is capable of conducting a forward current in the turned-on state;

a reverse diode, which is capable of blocking a forward voltage of the switching function and which becomes conductive if a current is being injected into its conductive direction, which is reverse to the aforementioned parallel power switch.

FIG. 2A, FIG. 2B and FIG. 2C illustrate exemplary switch members. FIG. 2B illustrates a functional representation of a reverse conductive power switch. Referring to FIG. 2B, the reverse conductive power switch is represented by its two basic elements, namely a controlled power switch, and a parallel reverse diode. The power switch can be any kind of suitable semiconductor power switch. FIG. 2C illustrates a unidirectional IGBT in combination with a reverse diode. FIG. 2A illustrates a power MOSFET which enables reverse conduction by its body diode.

FIG. 3 illustrates an exemplary half bridge. A half-bridge or switch leg comprises two switch members connected in series, which results in three terminals: the high-side switch member, which is to be connected to the positive potential of the DC voltage Vp;

the low-side switch member, which is to be connected to the negative potential of the DC voltage Vn;

the switched output pole Vac, namely the junctions of the two switch members, which is to be connected to the resonant load circuit.

Thus, the half-bridge, or so-called switching leg or switching branch, is capable to convert a DC current into an AC current or vice versa; it may be used as a power inverter or a controllable rectifier.

Figure 4:
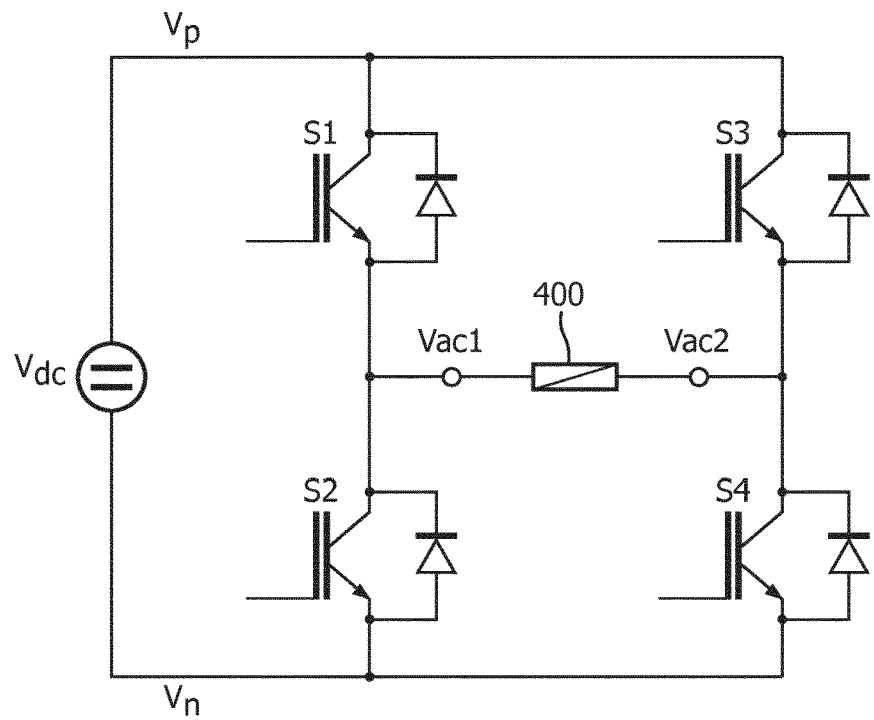
FIG. 4 illustrates an exemplary resonant converter comprising a full-bridge configuration.

FIG. 4 illustrates an exemplary resonant converter comprising a full-bridge configuration. The resonant converter is connected to a DC voltage source Vdc, and a resonant circuit 400. The full-bridge configuration comprises two parallel switching branches. One switching branch comprises two series-connected switch members S1 and S2, and the other switching branch comprises two series-connected switch members S3 and S4. Each switch member is a complementary switch member of the other switch member of the same switching branch. For example, S1 is a complementary switch member of S2, and vice versa. The high-side switch members S1 and S3 are connected to the positive potential Vp of the DC voltage source, and the low-side switch members S2 and S4 are connected to the negative potential Vn of the DC voltage source. A diagonal pair is formed by two switch members which are arranged in different switching branches and via which the load can be connected to the low and high potential terminals of the DC voltage source. Referring to FIG. 4, S1 and S4 form a diagonal pair, and S2 and S3 also form a diagonal pair. The resonant circuit 400 is connected between the two conjunctions Vac1, Vac2 of the two switching branches.

Figure 5:
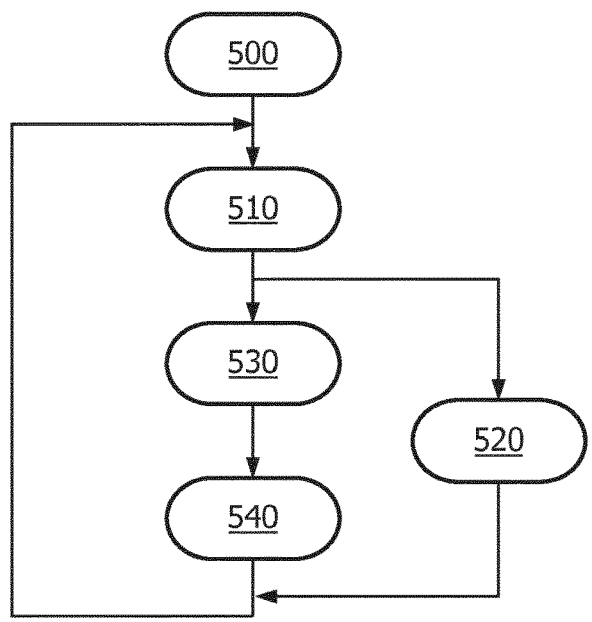
FIG. 5 illustrates a method of controlling a resonant converter comprising a full-bridge configuration in accordance with an embodiment of the present invention.
Figure 6:
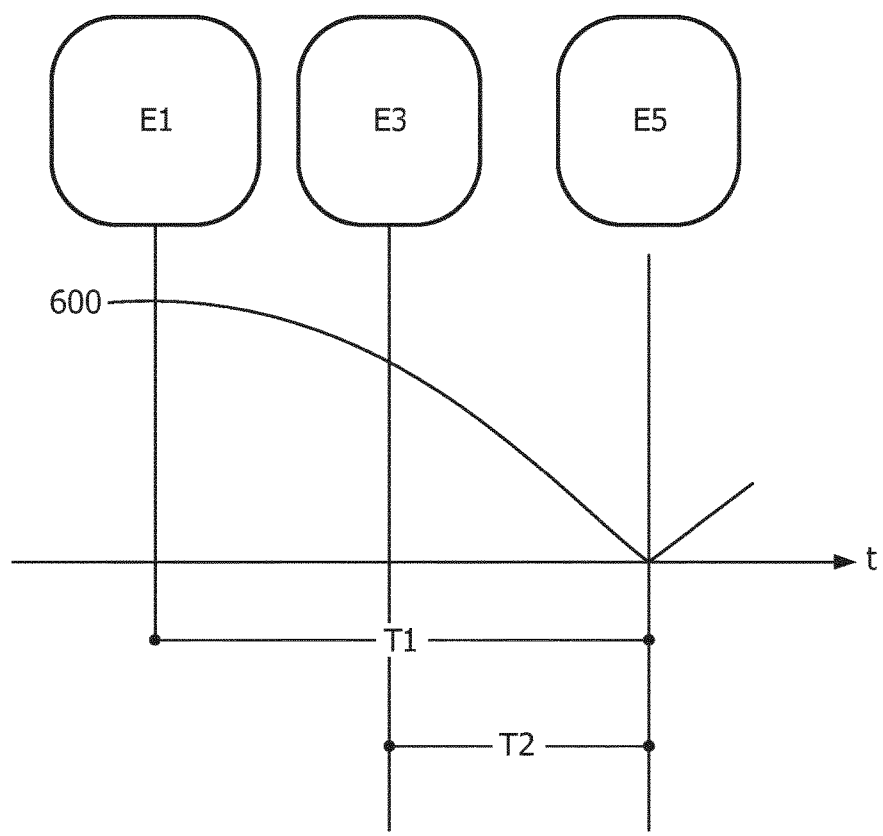
FIG. 6 illustrates the sequence of turn-off switching events, the time interval for turn-on switching events and the current zero-crossing event in a half resonant period in accordance with the method of FIG. 5.

FIG. 5 illustrates a method of controlling a resonant converter comprising a full-bridge configuration in accordance with an embodiment of the present invention. FIG. 6 illustrates the sequence of turn-off switching events, the time interval for turn-on switching events and the zero crossing event in a half resonant period in accordance with the method of FIG. 5. The curve 600 in FIG. 6 represents the absolute value of the resonant current over time t. Referring to FIG. 5, the illustrated method causes a sequence of switching events during a half period of the resonant current, starting from an initial state 500 in which a diagonal pair of the full-bridge are conductive. Referring to FIG. 5 and FIG. 6, at 510, a first switch member of the initially conductive diagonal pair is turned off (denoted as switching event E1) on the basis of the voltage control signal. At 520, the switch member in series connection with the first switch member is turned on (denoted as switching event E2) after the turn-off of the first switch member but prior to a zero crossing (denoted as zero crossing event E5) of the resonant current. At 530, a second switch member of the initially conductive diagonal pair is turned off (denoted as switching event E3) after the turn-off of the first switch member but prior to the zero crossing of the resonant current. At 540, the switch member in series connection with the second switch member is turned on (denoted as switching event E4) after the turn-off of the second switch member but prior to the zero crossing of the resonant current. Up until this point, the initially conductive diagonal pair are turned off, and the other diagonal pair of switch members are turned on and thus become conductive. Consequently, the two diagonal pairs alternately become the initially conductive diagonal pair in consecutive half resonant periods. In other words, referring to FIG. 6, the two switch members of the initially conductive diagonal pair are subsequently turned off at events E1 and E3;

the switching event E2 (i.e. the turn-on of the complementary switch member of the first switch member) can occur at any time of the time interval T1 between the switching event E1 (i.e. the turn-off of the first switch member) and the event E5 (i.e. zero crossing of the resonant current);

the switching event E4 (i.e. the turn-on of the complementary switch member of the second switch member) can occur at any time of the time interval T2 between the switching event E3 (i.e. the turn-off of the second switch member) and the event E5 (i.e. zero crossing of the resonant current).

In a half resonant period, the initially conductive diagonal pair can be S1 and S4, or S2 and S3. The first switch member of the initially conductive diagonal pair can be any one of the two switch members of the initially conductive diagonal pair. Thus, there are four different scenarios, depending on which diagonal pair is initially conductive and which switch member of the initially conductive diagonal pair is the first switch member turned off at switching event E1. Table 1 presents, in each row, the switch members corresponding to each of the switching events E1 to E4 in accordance with a scenario.

TABLE 1

Four exemplary switching sequences in a half resonant period in accordance with the method of FIG. 5.

| Row | Switch member of E1 | Switch member of E2 | Switch member of E3 | Switch member of E4 |
|---|---|---|---|---|
| 1 | S4 | S3 | S1 | S2 |
| 2 | S1 | S2 | S4 | S3 |
| 3 | S2 | S1 | S3 | S4 |
| 4 | S3 | S4 | S2 | S1 |

In row 1 and row 2, the initially conductive diagonal pair comprises the diagonal pair formed by S4 and S1. In row 3 and row 4, the initially conductive diagonal pair comprises the diagonal pair formed by S2 and S3. The first switch member which is turned off at switching event E1 is S4 in row 1, and S1 in row 2. The first switch member which is turned off at switching event E1 is S2 in row 3, and S3 in row 4. Taking row 1 as an example, during one half resonant period, starting from S1 and S4 being conductive, S4 is first turned off on the basis of the voltage control signal, S3 is turned on after the turn-off of S4 but prior to the zero crossing, S1 is turned off after the turn-off of S4 but prior to the zero crossing, S2 is then turned on after the turn-off of S1 but prior to the zero crossing.

In accordance with an embodiment of the present invention, the switching event E3, namely the turn-off of the second switch member of the initially conductive diagonal pair, occurs at a zero crossing predicting event, wherein a zero crossing predicting event leads a respective zero crossing of the resonant current by a predetermined advancing time interval. Specially, a zero crossing predictor can be configured to provide a zero crossing predicting signal indicating zero crossing predicting events of the resonant current, and the switching event E3 is triggered on the basis of the zero crossing predicting signal.

The predetermined advancing time interval is a relatively small time interval. Preferably, the predetermined advancing time can be 5% to 15% of the resonant period. That is, it is proposed to turn off the second switch member at a time-point closer to the zero crossing of the resonant current. Since the second switch member is turned off at a zero crossing predicting event, the second switch member is turned off at a small resonant current, and thus the switching loss is also low. Generally, the smaller the predetermined advancing time, the smaller the resonant current at the zero crossing predicting event becomes, and the lower the switching loss becomes.

Figure 7:
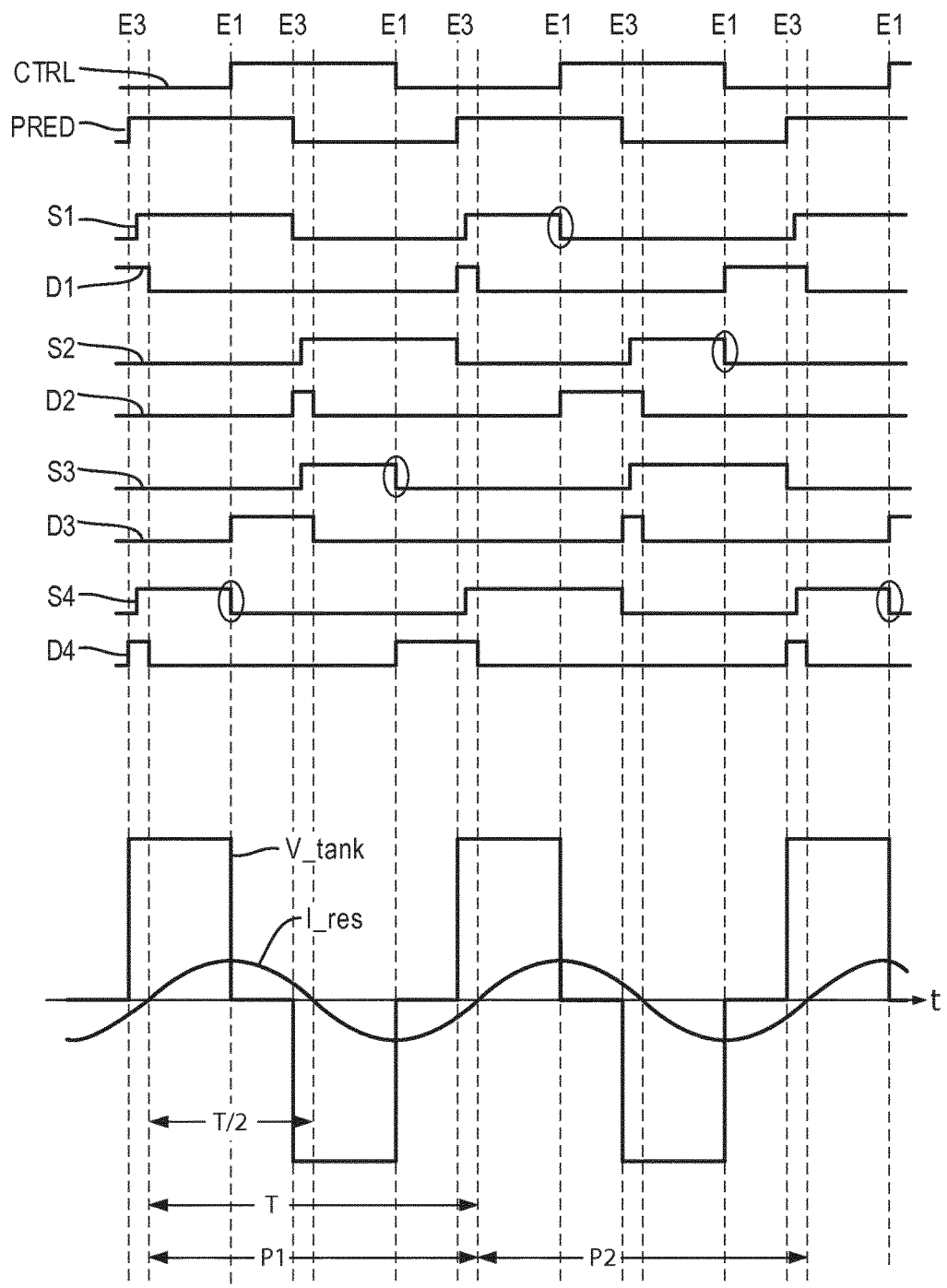
FIG. 7 illustrates the sequence of switching events in a plurality of resonant periods together with the curves of tank voltage and resonant current in accordance with an embodiment of the present invention.

FIG. 7 illustrates an exemplary sequence of switching events in a plurality of consecutive resonant periods P1, P2 together with the curves of tank voltage V_tank and resonant current I_res in accordance with an embodiment of the present invention. The voltage control signal CTRL is served to control the output voltage of the resonant converter by means of triggering the switching event E1, namely the turn-off of the first switch of the initially conductive diagonal pair. Referring to FIG. 7, the voltage control signal triggers the switching event E1 with its edges, more particularly by its rising edge in case of a positive resonant current and by its falling edge in case of a negative resonant current. In other embodiments, the voltage control signal may trigger the switching event E2 in a different way, e.g. with rising edges only or falling edges only. The zero crossing-predicting signal PRED is served to trigger the switching event E3, namely the turn-off of the second switch of the initially conductive diagonal pair. Referring to FIG. 7, the zero crossing-predicting signal PRED triggers the switching event E3 with its edges, and more particularly, with its falling edge in case of a positive resonant current and with its rising edge in case of a negative resonant current. In other words, the zero crossing-predicting signal PRED indicates zero crossing-predicting events of the resonant current by level change. In other embodiments, the zero crossing-predicting signal PRED can indicate zero crossing-predicting events of the resonant current in a different way, e.g. by means of its falling edges or its rising edges, only. In FIG. 7, S1, S2, S3 and S4 illustrate the state of the respective switch members, and D1, D2, D3 and D4 illustrate the state of the respective diodes of the switch members. More particularly, the high level indicates the turn-on or conductive state, and the low level indicates the turn-off or block state. The tank voltage V_tank is the voltage across the switched output poles Vac1 and Vac2 of the full bridge of the resonant converter. In the initial state where a diagonal pair is conductive, the voltage tank V_tank keeps increasing until one of the diagonal pair is turned off at the switching event E1.

In the first half period of P1, the diagonal pair formed by S1 and S4 is initially conductive, the switch member S4 is turned off first as triggered by the voltage control signal CTRL, the switch member S1 is then turned off as triggered by the zero crossing-predicting signal PRED, the switch members S2 and S3 are turned on between the switching event E3 and the zero crossing of the resonant current. The switch member S3 can also be turned on at a different time, provided the switch member S3 is turned on after the turn-off of S4 but prior to the zero crossing of the resonant current.

Both turn-on events of S2 and S3 are lossless. The switching loss of the turn-off event of S1 is also low because S1 is turned off at a timepoint closer to the zero crossing of the resonant current, and thus is turned off at a low resonant current. The switching loss of the turn-off event of S4 is higher as compared to the turn-off event of S1. In other words, the first switch member, S4 in the first half period of P1, suffers a larger switching loss, even if the control pattern allows to reduce it by means of a snubber capacitor which provides a ZVS condition. As described in the above, any one of the initially conductive diagonal pair of switches can be the first switch which is turned-off on the basis of the voltage control signal. Referring to the first half period of the second period P2, the diagonal pair formed by S1 and S4 is initially conductive similar to the first half period of the first period P1, but the switch member S1, not the switch member S4, is turned off first as triggered by the voltage control signal CTRL. In other words, the switching event E1 with high switch loss occurs at switch member S4 in the first period P1, but occurs at switch member S1 in the second period P2. Similarly, referring to the second half period of the first period P1 and second period P2, the switching events E1 with high switch loss respectively occur at switch member S2 and S3. As compared to the case where the switching event E1 with high switch loss always occurs at the same switch member, the switch loss can be uniformly distributed across the four switch members.

In FIG. 7, the switching events E1 occur at switch members in a repeatable order: S4-S3-S1-S2. In other embodiments, the switching events E1 occur at switch members in a different order. For example, the switching events E1 can occur at switch members in a repeatable order: S4-S2-S1-S3. In these two cases, the first switch of the initially conductive diagonal pair alternates between S4 and S1 or between S2 and S3 every resonant period. Alternatively, the first switch of the initially conductive diagonal pair can alternate every two, three or any number of consecutive resonant periods. For example, in case it alternates every two consecutive resonant periods, the switching events E1 can occur at switch members in a repeatable order: S4-S2-S4-S2-S1-S3-S1-S3. In the above cases, the alternation for the two diagonal pairs is similar. Alternatively, the alternation of one diagonal pair S1 and S4 and the alternation of the other diagonal pair S2 and S3 can also be different. For example, the alternation of the switching event E1 between the two switch members can be every resonant period for one diagonal pair and every two resonant periods for the other diagonal pair, namely such that the switching event E1 can occur at switch members in a repeatable order: S4-S2-S1-S2-S4-S3-S1-S3.

Figure 8:
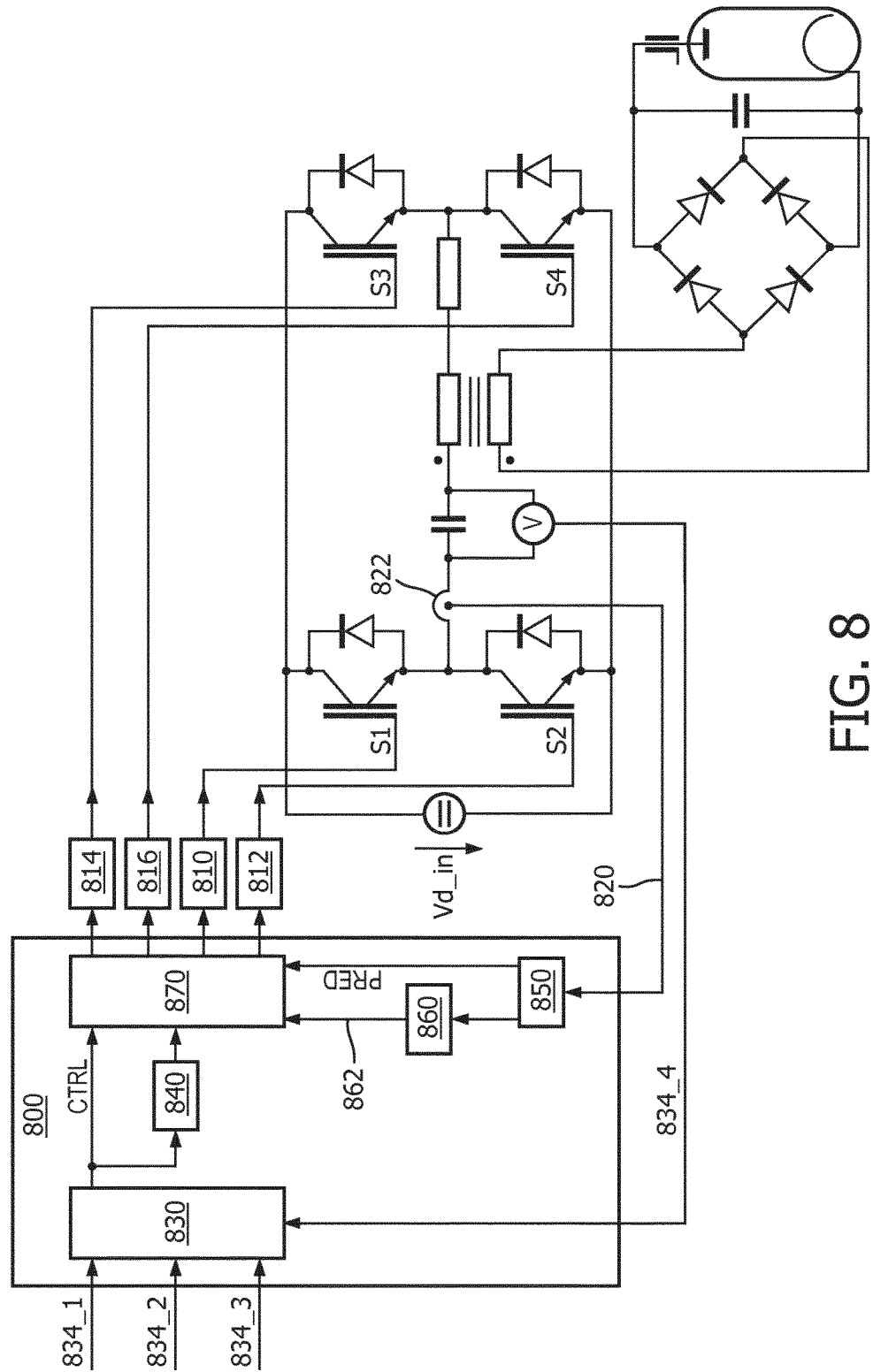
FIG. 8 illustrates a control circuit for controlling a resonant converter comprising a full-bridge configuration in accordance with a first embodiment of the present invention.
Figure 9:
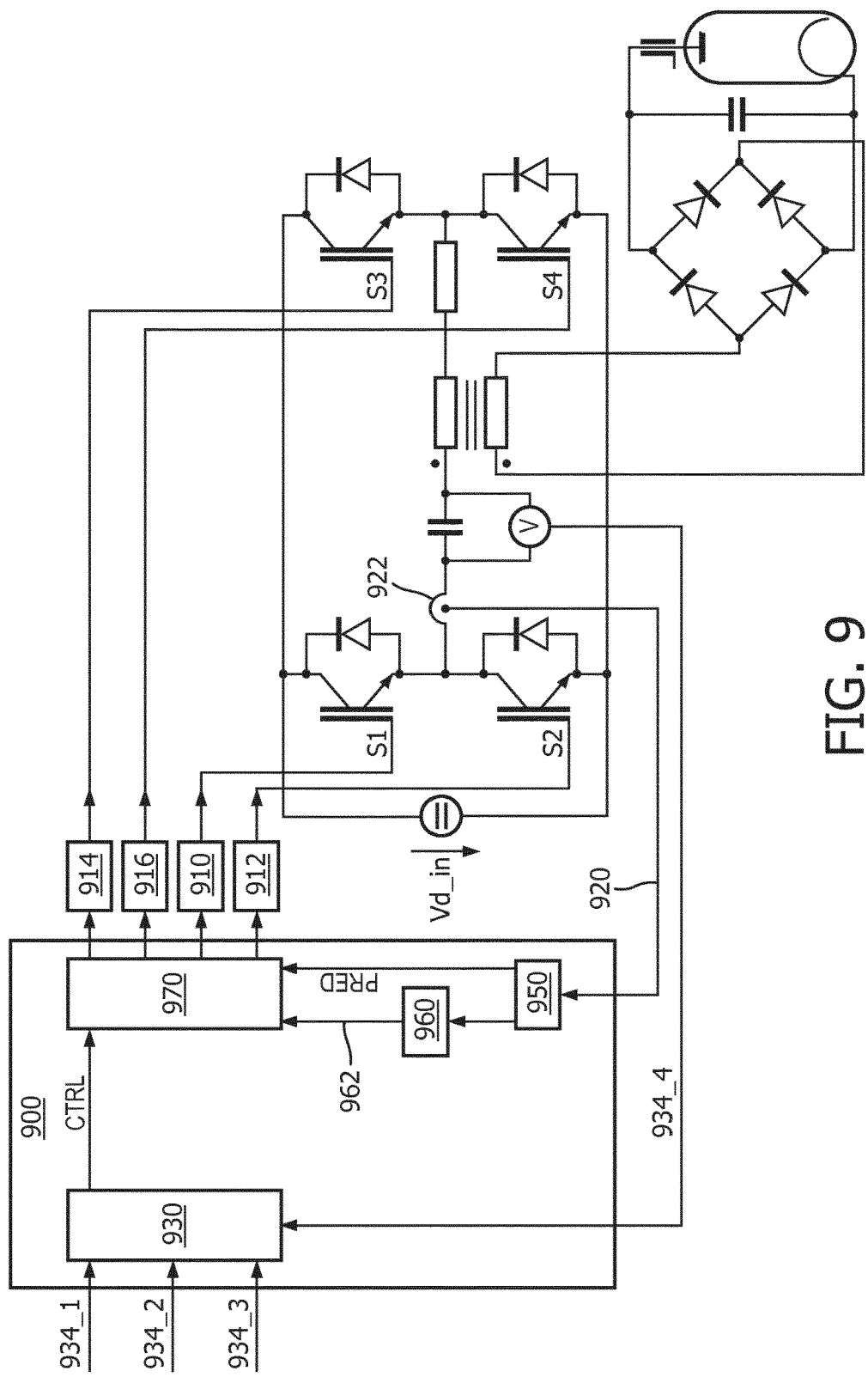
FIG. 9 illustrates a control circuit for controlling a resonant converter comprising a full-bridge configuration in accordance with a second embodiment of the present invention.
Figure 10:
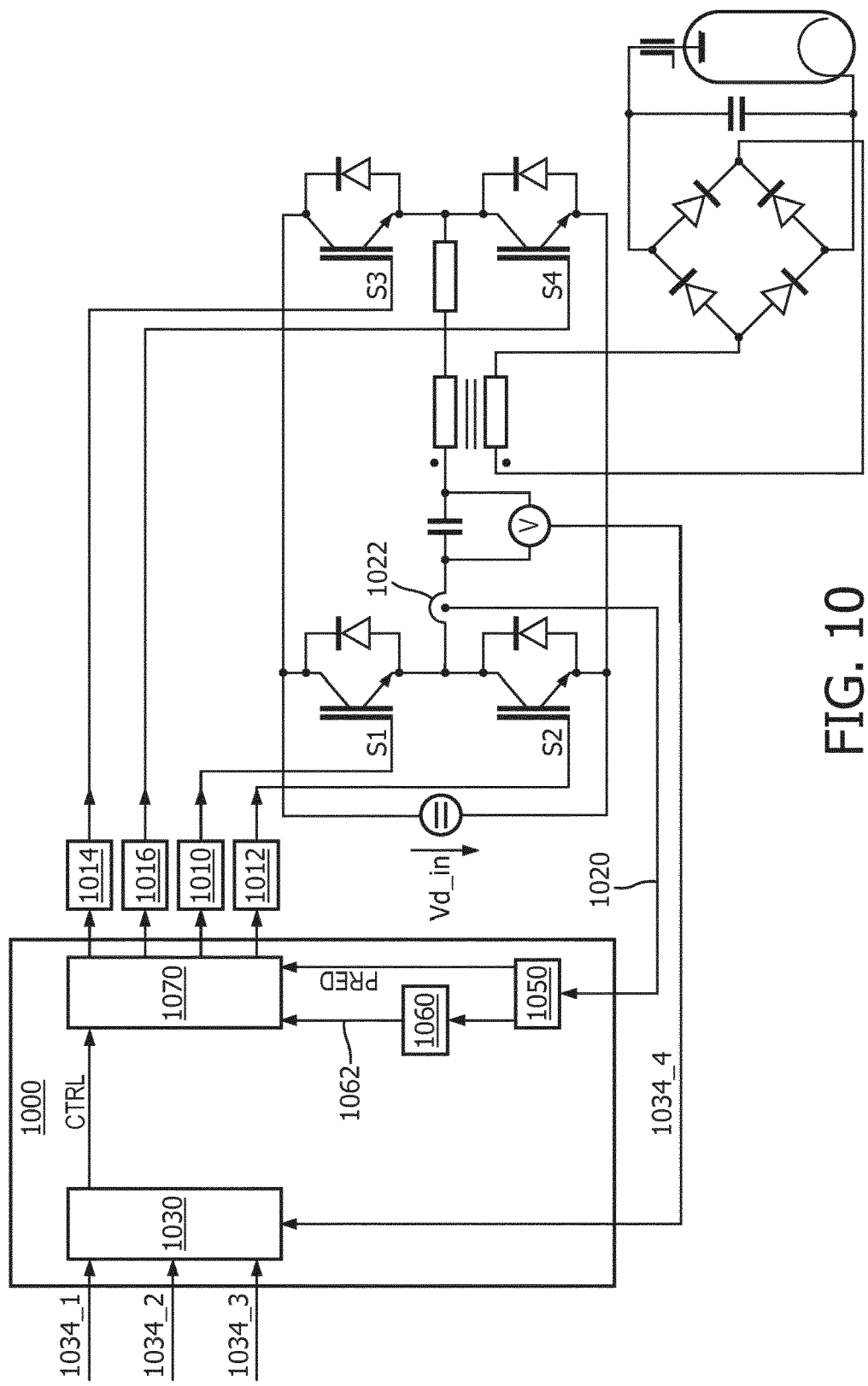
FIG. 10 illustrates a control circuit for controlling a resonant converter comprising a full-bridge configuration in accordance with a third embodiment of the present invention.

FIG. 8, FIG. 9 and FIG. 10 respectively illustrate several exemplary control circuits for controlling a resonant converter comprising a full-bridge configuration.

FIG. 8 illustrates a first exemplary control circuit 800 for controlling the four switch members S1 to S4 of the resonant converter. The control circuit 800 is configured to provide four drive signals controlling the switching events of the four switch members S1 to S4 by means of providing four drive signals 810, 812, 814, 816 which respectively drive the four switch members S1, S2, S3, S4. The control circuit 800 is further configured to receive a current feedback signal 820 from the resonant converter. The current feedback signal 820 represents the measured resonant current I_res of the resonant converter. For example, the current feedback signal 820 can be provided by a current sensor 822.

The control circuit 800 comprises an output voltage controller 830. The output voltage controller 830 is configured to provide an aforementioned voltage control signal CRTL for triggering the switching event E1 on the basis of one or more input signals. In an example where the load of the resonant converter is an x-ray tube, the one or more input signals comprise the setpoint 834_1 of the tube voltage, the setpoint 834_2 of the tube current, the measured actual value 834_3 of the tube current and the measured actual voltage of the resonant capacitor 834_4 as fed back from the resonant converter, and which may be a useful input for the output voltage controller 830.

The control circuit 800 further comprises a zero crossing predictor 850 for providing a zero crossing-predicting signal PRED, which indicates zero crossing-predicting events of the resonant current. Each zero crossing-predicting event leads a respective zero crossing of the resonant current by a predetermined advancing time interval. The zero crossing-predicting signal PRED is used to trigger the switching event E3.

The control circuit 800 further comprises a second delay unit 840 for providing a second delayed signal 842. The second delayed signal 842 indicates events which lag the turn-off of the first switch member by a second predetermined delay time and is prior to the zero crossing event. The second delayed signal 842 is used to trigger the switching event E2. In an embodiment, the second delay unit 840 is configured to provide the second delayed signal 842 by delaying the voltage control signal CTRL by the second predetermined delay time.

The control circuit 800 further comprises a first delay unit 860 for providing a first delayed signal 862, which indicates delayed zero crossing-predicting events, wherein each delayed zero crossing-predicting event lags a corresponding zero crossing-predicting event by a first predetermined delay time and is prior to a corresponding zero crossing of the resonant current. The first delayed signal 862 is used to trigger the switching event E4. In an embodiment, the delay unit 860 is configured to provide the first delayed signal by delaying the zero crossing-predicting signal PRED by the first predetermined delay time.

The control circuit 800 further comprises a switch encoder 870 for providing the four drive signals 810, 812, 814, 816. The switch encoder 870 is configured to generate the four drive signals 810, 812, 814, 816 on the basis of the voltage control signal CTRL, the zero crossing predicting signal PRED, the first delayed signal 862 and the second delayed signal 842. Each drive signal is used to drive the turn-on, turn-off of a respective switch member. In an embodiment, the drive signal is connected to the gate of the respective switch member, and the switch member is turned on when the drive signal changes to a high signal level from a low signal level, and is turned off when the drive signal changes to a low signal level.

FIG. 9 illustrates a second exemplary control circuit 900 for controlling the four switch members S1 to S4 of the resonant converter. The second exemplary control circuit 900 of FIG. 9 is similar to the first exemplary control circuit 800 of FIG. 8 in that the output voltage controller 930, the zero crossing predictor 950, the first delay unit 960 of FIG. 9 are the same as those of FIG. 8. The difference lies in that the second exemplary control circuit 900 of FIG. 9 does not comprise a delay unit like the second delay unit 840 of FIG. 8. Unlike FIG. 8, where the first delayed signal and the zero crossing-predicting signal PRED are respectively used to trigger the switching events E2 and E3, the zero crossing-predicting signal PRED in FIG. 9 is used to trigger both the switching event E2 and the switching event E3. The switch encoder 970 is thus configured to generate the four drive signals 910, 912, 914, 916 on the basis of the voltage control signal CTRL and the zero crossing-predicting signal PRED.

FIG. 10 illustrates a third exemplary control circuit 1000 for controlling the four switch members S1 to S4 of the resonant converter. The third exemplary control circuit 1000 of FIG. 10 is similar to the aforementioned exemplary control circuit 900 of FIG. 9 in that the output voltage controller 1030, the zero crossing predictor 1050, the first delay unit 1060 of FIG. 10 are the same as those of FIG. 9. The difference lies in that the zero crossing predicting signal is used to trigger the switching event E2 in FIG. 9, whilst the first delayed signal 1062 is used to trigger the switching event E2 in FIG. 10. In other words, the first delayed signal 1062 is used to trigger both the switching event E2 and the switching event E4 in FIG. 10. This embodiment results in a sequence of drive signals 1010, 1012, 1014, 1016 which are capable of triggering the sequence of switching events as depicted in FIG. 7.

As described in the above, the switching event E2 can be triggered at any time between the turn-off of the first switch member and the zero-crossing of the resonant current. Thus, the triggering of the switching event E2 is not limited to the above embodiments. That is, while the switching event E2 is triggered by the second delayed signal in FIG. 8, by the zero predicting signal PRED in FIG. 9 and by the first delayed signal in FIG. 10, the switching event E2 can be triggered in other ways in different embodiments.

Figure 11:
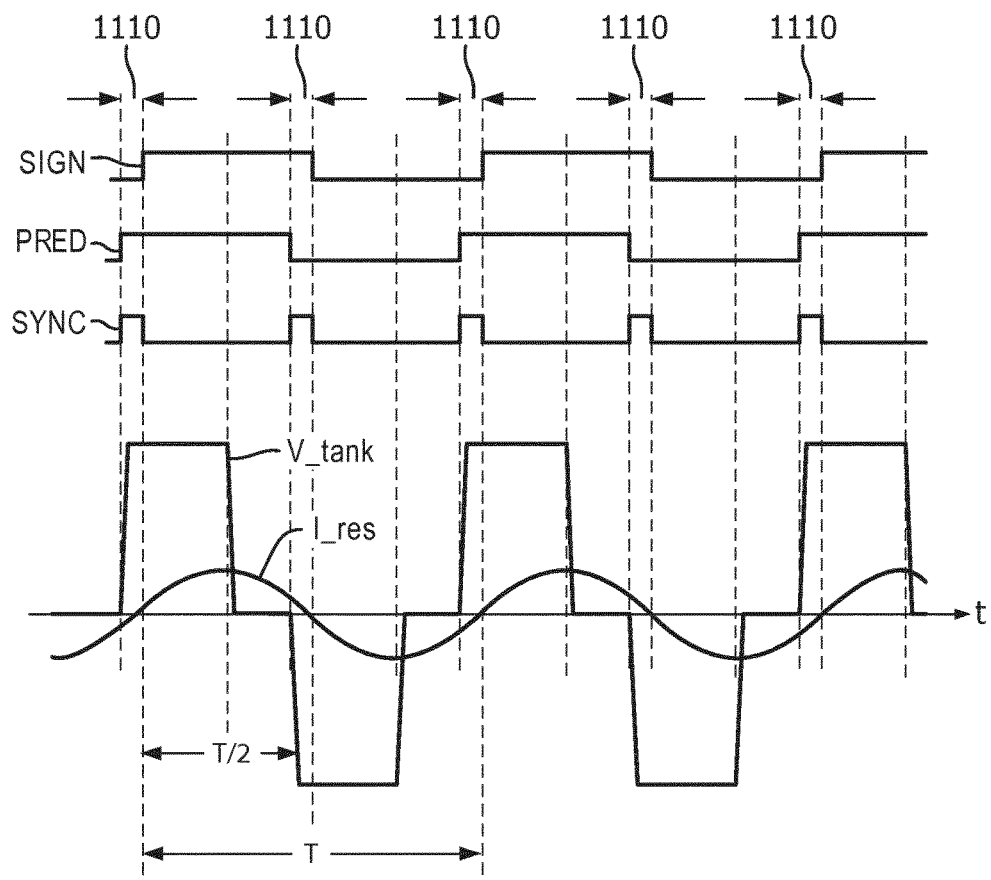
FIG. 11 illustrates the signals generated by a zero crossing predictor in accordance with an embodiment of the present invention.
Figure 12:
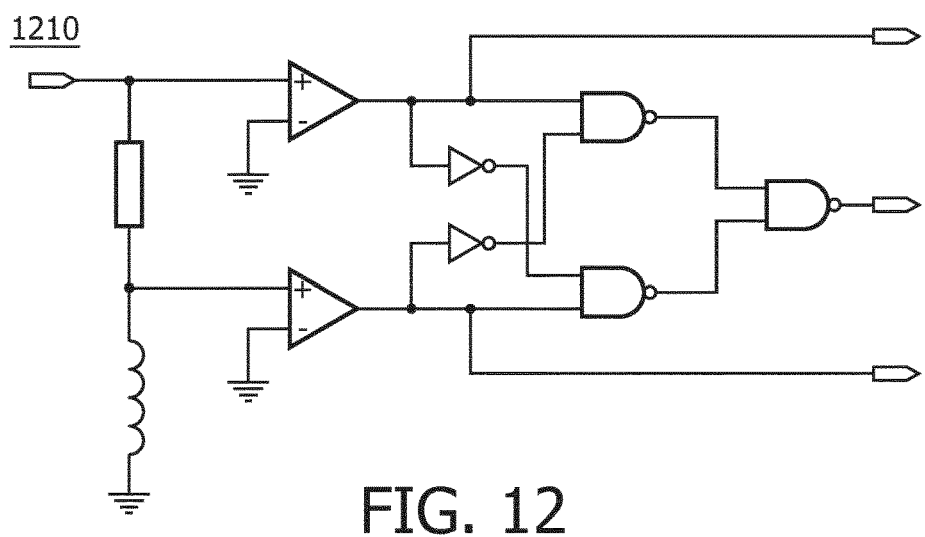
FIG. 12 illustrates an exemplary zero crossing predictor for generating the signals in FIG. 11.

FIG. 11 illustrates the signals generated by a zero crossing predictor in accordance with an embodiment of the present invention. FIG. 12 illustrates an exemplary zero crossing predictor for generating the signals in FIG. 11.

Referring to FIG. 11, the signals SIGN, PRED and SYNC generated by a zero crossing predictor are illustrated with respect to the resonant current I_res. The signal SIGN indicates the zero crossings of the resonant current by means of its edges. The signal PRED indicates the zero crossing-predicting events by means of its edges. Each zero crossing-predicting event leads the corresponding zero crossing by the predetermined advancing time interval 1110. The SYNC indicates the zero crossing of the resonant current by means of its falling edges, and indicates the zero crossing-predicting events by means of its rising edges.

Referring to FIG. 11, the zero crossing predictor is embodied as a circuit having an input terminal 1210 for receiving the measured resonant current, and three output terminals for outputting the SIGN signal, the PRED signal, and the SYNC signal. In some embodiments, the zero crossing predictor may not generate the SYNC signal. In some other embodiments, the zero crossing predictor may only output the SYNC signal.

The switch encoder, the first delay unit, and the second delay unit can be implemented in various ways. For illustrative purposes, some exemplary implementations for the switch encoder and the first delay unit in FIG. 10 are described herein. However, the protection scope of the present invention is not restricted to these detailed implementations.

Figure 13:
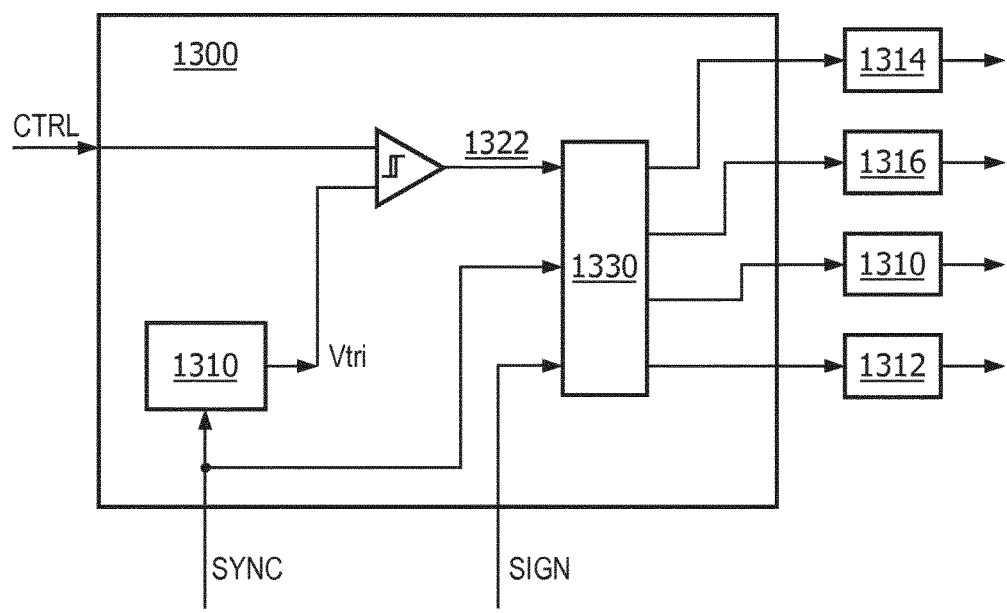
FIG. 13 illustrates a first exemplary circuit which implements the switch encoder and the first delay unit of FIG. 8, FIG. 9 or FIG. 10 in accordance with an embodiment of the present invention.
Figure 20:
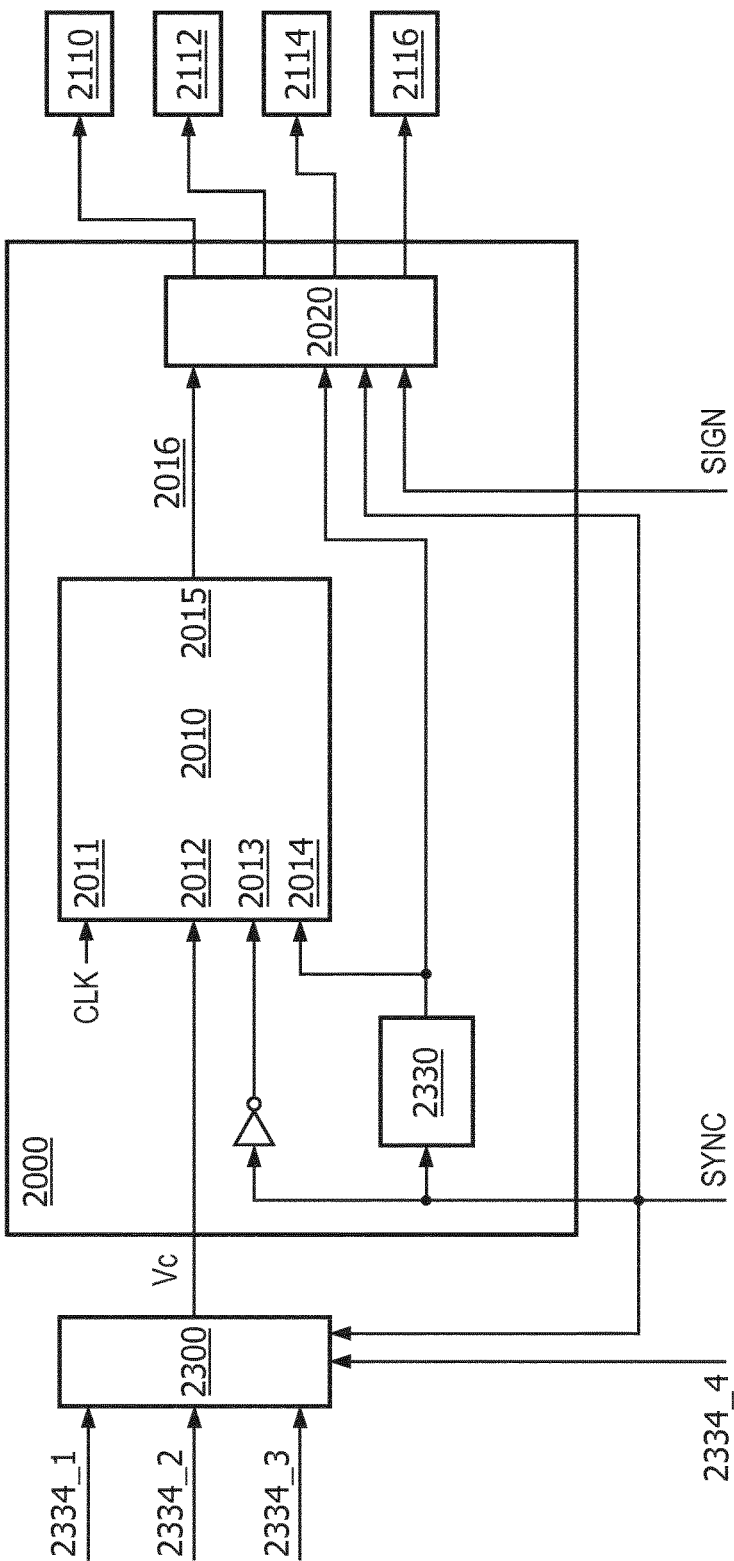
FIG. 20 illustrates a second exemplary circuit which implements the switch encoder and the first delay unit of FIG. 8, FIG. 9 or FIG. 10 in accordance with an embodiment of the present invention.

FIG. 13 and FIG. 20 respectively illustrate two exemplary implementations for the switch encoder and the first delay unit in FIG. 8, FIG. 9 or FIG. 10 in accordance with some embodiments of the present invention. As for the voltage controller, any suitable implementation currently known or developed in future is applicable.

FIG. 13 illustrates a first exemplary circuit 1300 which implements the switch encoder and the first delay unit in FIG. 8, FIG. 9 or FIG. 10. The exemplary circuit 1300 comprises a synchronous sawtooth generator 1310, a comparator 1320, and a digital encoder 1330. The synchronous sawtooth generator 1310 is configured to derive a sawtooth signal Vtri from the zero crossing-predicting signal PRED. Alternatively, synchronous sawtooth generator 1310 is configured to derive sawtooth signal Vtri from the signal SYNC. The comparator 1320 is configured to provide a phase signal 1322 on the basis of the voltage control signal and the sawtooth signal. The digital encoder 1330 is configured to provide a drive signal 1310, 1312, 1314, 1316 for each switch member on the basis of the phase signal 1322 and the SYNC signal. Alternatively, the synchronizing signal SYNC can be replaced by the zero crossing signal SIGN and the zero crossing-predicting signal PRED in some implementations. In some other implementations, the zero crossing signal SIGN can be provided in addition to the synchronizing signal SYNC (see FIG. 12).

Figure 14:
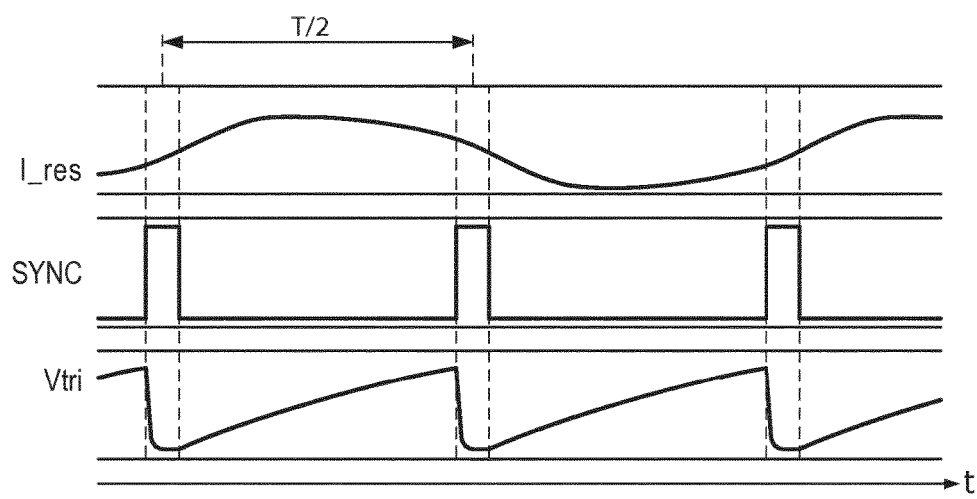
FIG. 14 illustrates the sawtooth signal generated by a synchronous sawtooth generator in accordance with an embodiment of the present invention.

FIG. 14 illustrates the sawtooth signal generated by a synchronous sawtooth generator in accordance with an embodiment of the present invention. Referring to FIG. 14, the sawtooth signal Vtri is illustrated with respect to the SYNC signal and the resonant current I_res.

Figure 15:
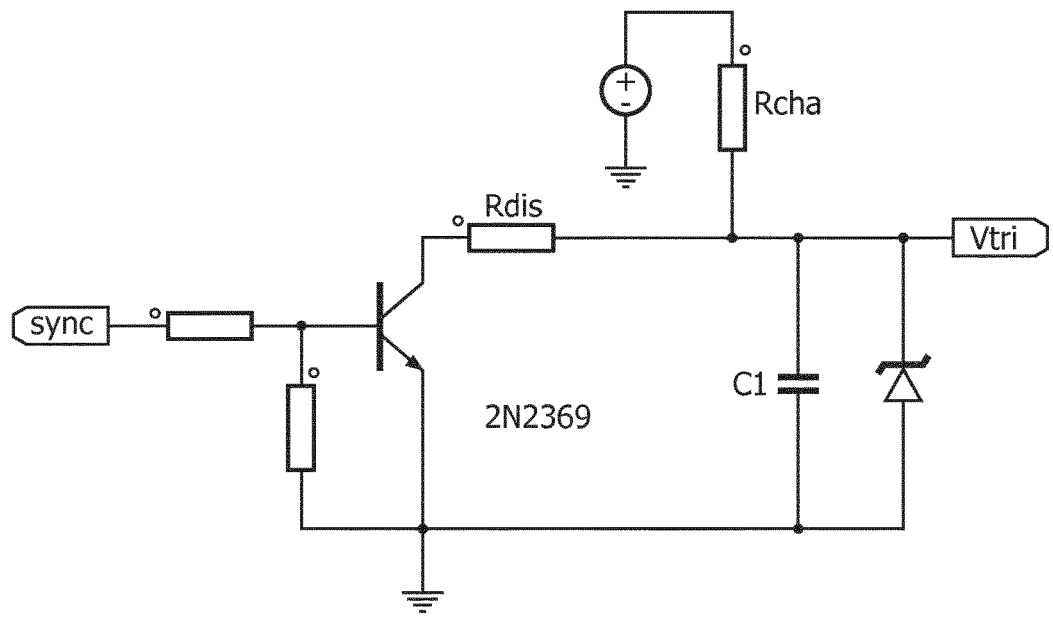
FIG. 15 illustrates an exemplary sawtooth generator for generating the sawtooth signal of FIG. 14.

FIG. 15 illustrates an exemplary sawtooth generator for generating the sawtooth signal of FIG. 14. An ideal sawtooth generator would contain a current source, because it drives a linear voltage slope. For an easier implementation, a voltage source may suffice which leads to a nonlinearly rising slope. Please note that the discharge resistor Rdis needs to be much smaller than the charging resistor Rcha.

Figure 16:
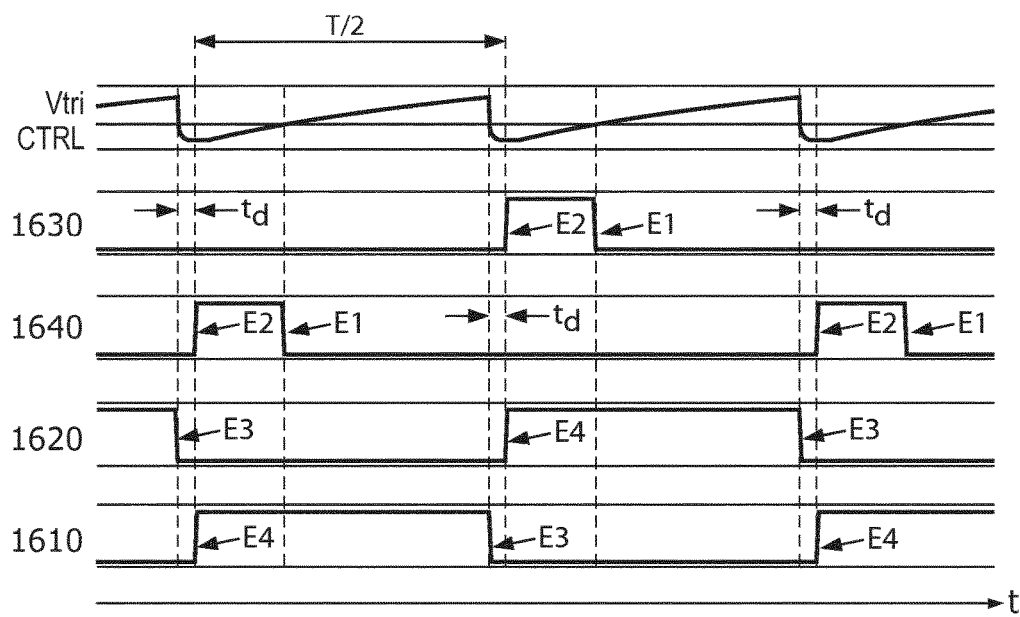
FIG. 16 illustrates drive signals generated by a digital encoder in accordance with an embodiment of the present invention.
Figure 17:
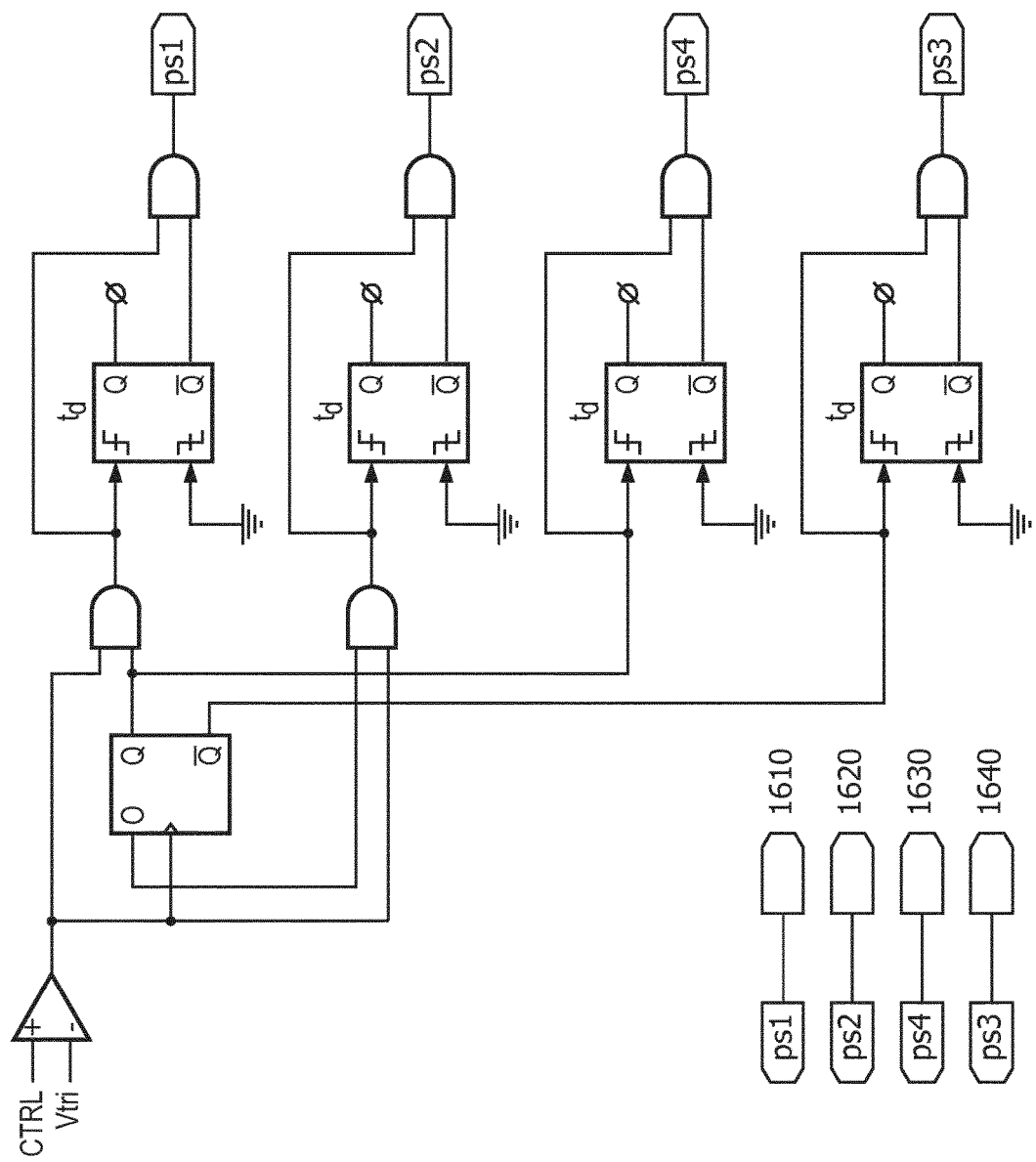
FIG. 17 illustrates an exemplary digital encoder for generating the drive signals of FIG. 16.

FIG. 16 illustrates the drive signals generated by a digital encoder in accordance with an embodiment of the present invention. FIG. 17 illustrates an exemplary digital encoder for generating the drive signals 1610, 1620, 1630, 1640 of FIG. 16. In this embodiment, the switching losses of the switching events E1 are not equally shared among the four switch members, and only the switch members driven by the drive signals 1610 and 1620 dissipate the turn-off losses of the switching events E1.

Referring to FIG. 16, the drive signals 1610, 1620, 1630, 1640 for respectively driving the switch members S1, S2, S3, S4 are derived from the sawtooth signal Vtri and the voltage control signal CTRL. The level of the voltage control signal CTRL represents the maximum output voltage of the resonant converter.

At the zero crossing event of the resonant current, the sawtooth voltage Vtri starts to increase from zero. At the point where the sawtooth voltage Vtri crosses the voltage level of the voltage control signal CTRL, the switching event E1 is triggered. The sawtooth voltage keeps increasing until the rising edge of the SYNC signal, which indicates the zero crossing-predicting event. This event triggers a reset of the Vtri signal to zero, and thus triggers the switching event E3. Further, this event is delayed by a dead time period $t_d$, and thus triggers the switching events E2 and E4.

The drive signals in FIGS. 16 1610, 1620, 1630 and 1640 actually correspond to the embodiment illustrated by FIG. 10, wherein the switching events E2 and E4 are both triggered by the delayed zero crossing predicting event. Similarly, in some other embodiments, the digital encode can be implemented in such a way that the generated drive signals correspond to the embodiments illustrated by FIG. 8 or FIG. 9.

Referring to FIG. 16, it can be noted that the switching event E1 always occurs at the same switch member S3, S4 of each diagonal pair. Thus, the switch loss is not balanced among the four switch members.

Figure 18:
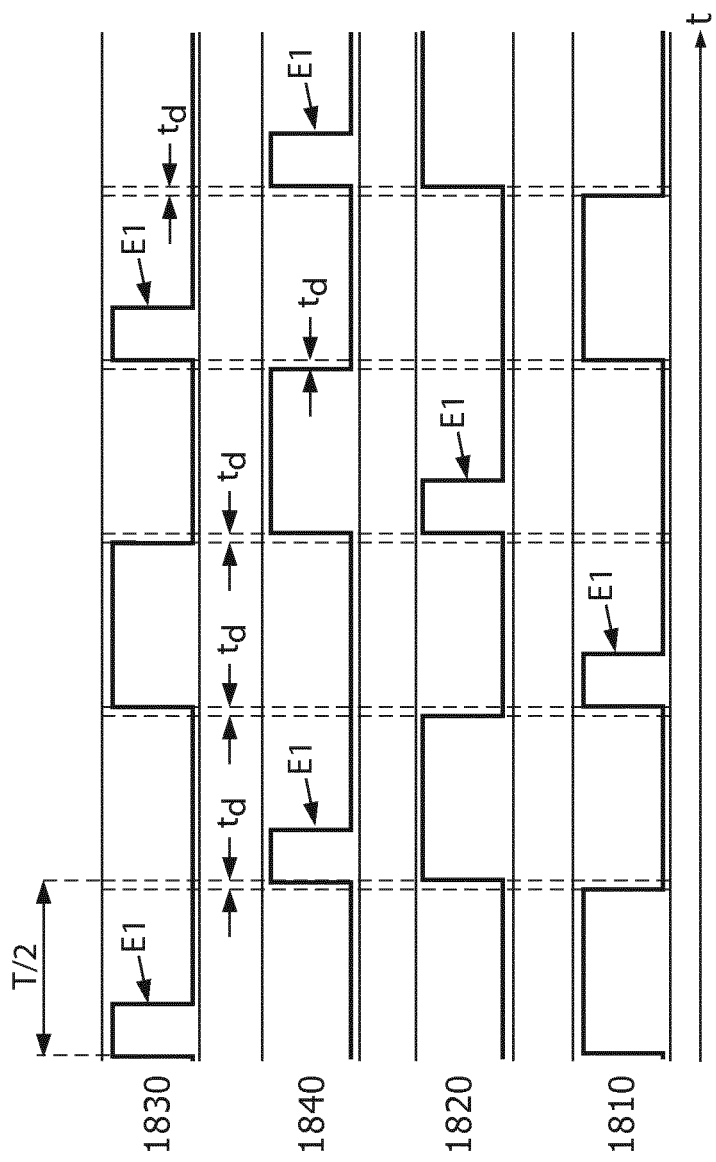
FIG. 18 illustrates drive signals generated by a digital encoder in accordance with another embodiment of the present invention.
Figure 19:
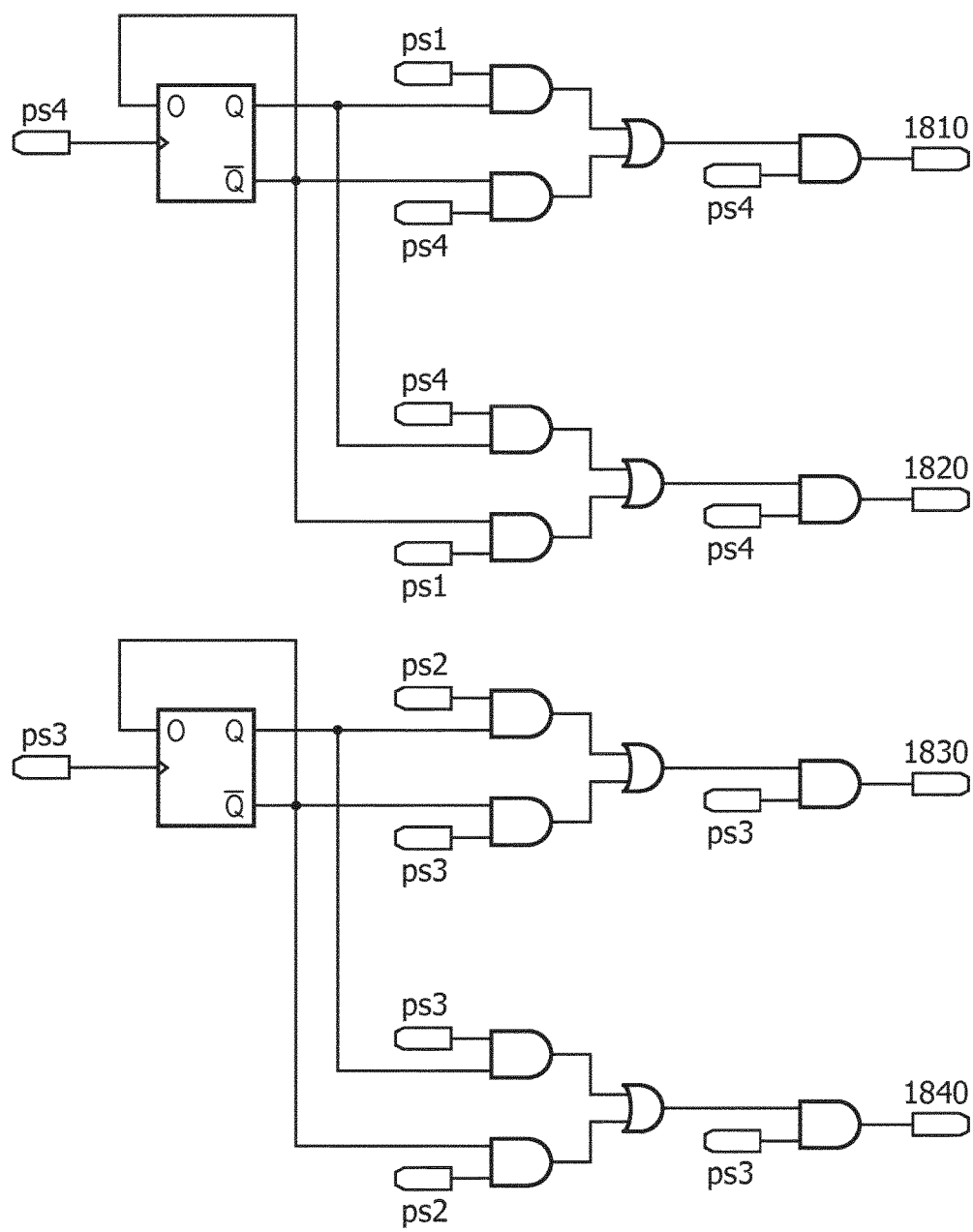
FIG. 19 illustrates an exemplary digital encoder for generating the drive signals of FIG. 18.

FIG. 18 illustrates drive signals generated by a digital encoder in accordance with another embodiment of the present invention. FIG. 19 illustrates an exemplary digital encoder for generating the drive signals 1810, 1820, 1830, 1840 of FIG. 18. In FIG. 18, the signals ps1, ps2, ps3, ps4 are the same as those in FIG. 17 and are generated on the basis of the voltage control signal CTRL and the sawtooth signal Vtri2016.

Unlike the embodiment in FIG. 16, the drive signals 1810, 1820, 1830, 1840, which respectively control the four switching members S1, S2, S3, S4, enable that the switching events E1 occur at all four switch members, and thus the switch losses are equally shared among the four switch members and, hence, are well balanced.

FIG. 20 illustrates a second exemplary circuit 2000 which implements the switch encoder and the first delay unit of FIG. 8, FIG. 9 or FIG. 10 in accordance with an embodiment of the present invention. Such implementation is particularly advantageous because both the output voltage controller and the pulse pattern generator may be operated on a single programmable device, resulting in a very cost efficient solution.

The exemplary circuit 2000 comprises a counter 2010, a digital encoder 2020 and a delay unit 2030. The delay unit 2030 delays the input signal SYNC by a short time interval $t_d$. The output voltage controller 2300 provides the voltage control signal CTRL as a data stream Vc to the counter 2010. The counter 2010 has four inputs 2011, 2012, 2013, 2014 and one output 2015. The input 2011 receives a clock signal CLK. The input 2012 receives the data stream Vc as the data input. The input 2013 receives the SYNC signal to trigger the countdown. The input 2014 receives the delayed SYNC signal to load the counter. The output 2015 delivers a phase signal 2016 to the digital encoder 2020. The digital encoder 2020, similar to the digital encoder 1330, is configured to generate the four drive signals 2110, 2112, 2114, 2116 for the switch members S1 to S4 on the basis of the phase signal 2016, the SYNC signal, and the delayed SYNC signal. Optionally, the zero crossing signal SIGN can be provided in addition to the synchronizing signal SYNC (see FIG. 20) in some implementations. Alternatively, the synchronizing signal SYNC can be replaced by the zero crossing signal SIGN and the zero crossing-predicting signal PRED in some other implementations.

Figure 21:
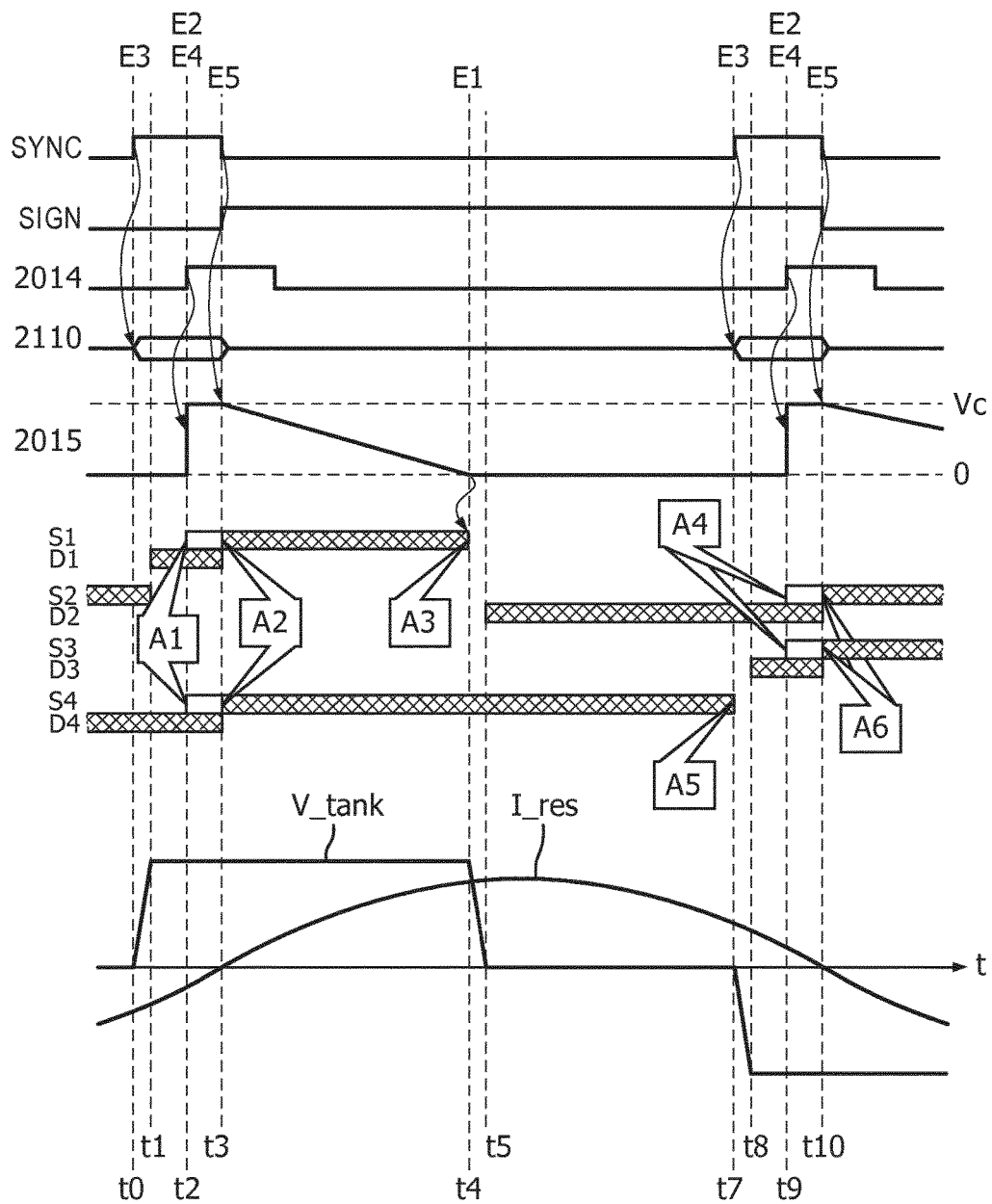
FIG. 21 illustrates an exemplary sequencing and timing operation of the second exemplary circuit of FIG. 20.
Figure 22:
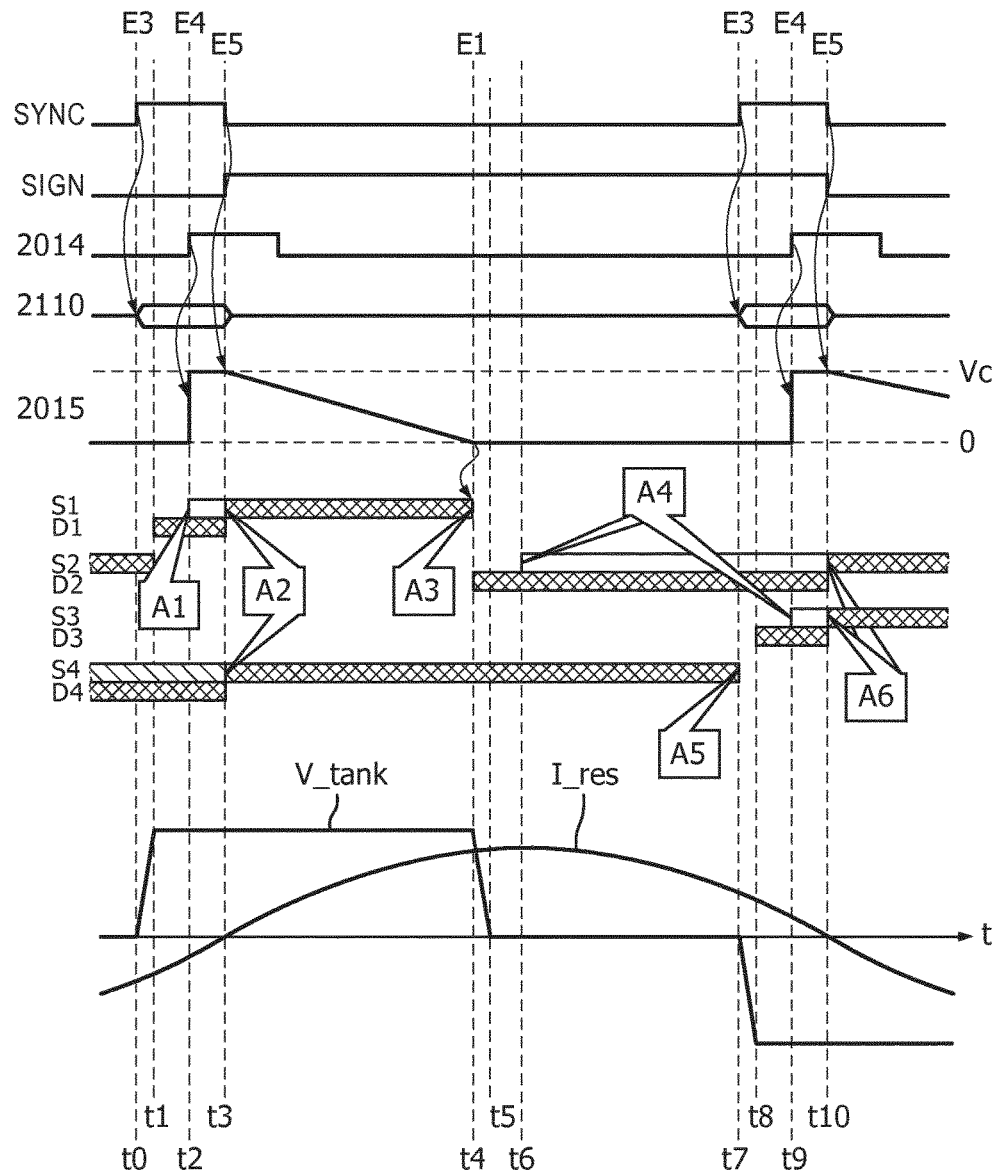
FIG. 22 illustrates an alternative sequencing and timing operation compared to FIG. 21.

An exemplary sequencing and timing of the second exemplary circuit 2000 is illustrated in FIG. 21. FIG. 22 illustrates an alternative sequencing and timing compared to FIG. 21. In FIG. 21, the switching event E2 and E4 concurrently occur at a timepoint between the zero crossing-predicting event and the zero crossing event. In FIG. 22, the switching event E4 still occurs at a timepoint between the zero crossing-predicting event E3 and the zero crossing event E5, but the switching event E2 occurs slightly after the parallel reverse diode becomes conductive and prior to the zero crossing-predicting event E5.

In FIG. 21 and FIG. 22, the reference signs A1 to A6 represent the following:
A1: ZCS turn-on while parallel reverse diode is conductive (E4);
A2: switches start conducting current, at resonant current zero crossing (E5);
A3: ZVS turn-off (E1), communication to diode;
A4: ZCS turn-on while parallel reverse diode is conductive (E2, E4);
A5: ZVS turn-off (E3); communication to diode;
A6: switches start conducting current, at resonant current zero crossing (E5).

In FIG. 21, the synchronizing signal SYNC, the zero crossing signal SIGN, the input 2014 (i.e. the delayed SYNC signal) of the counter 2010, the output 2015 of the counter 2010, and a data valid signal 2110 for the control data Vc are illustrated together with the state of the switches S1 to S4 and the parallel diodes D1 to D4 of the four switching members as well as the output voltage V_tank and resonant current I_res of the resonant converter. For the illustration of the state of the switches and the diodes, the shaded bar indicates a state when the respective switch or diode is active and conducts a current, and the white bar indicates a state when the respective switch is active (i.e. turned on), but the current in the active switch is still zero because it is conducted by its parallel diode in a direction reverse to the active switch. As previously described, the switch member can be represented by a switch and a parallel-connected reverse diode (FIG. 2B). For brevity, a switch member and the switch of the switch member are denoted by the same reference sign (S1, S2, S3, or S4) in FIG. 21 and the corresponding description.

Referring to FIG. 21, the "Countdown" phase represents how long the diagonal pair shall be conductive. When it reaches zero, i.e. at timepoint t4, the desired phase angle is met. The negative edge of the phase angle signal triggers the switching event E1, which is significant in order to control the transferred output power. After the switching event E1, the driving tank voltage V_tank remains at (almost) zero until the rising edge of the SYNC signal, i.e. at time point t7, triggers a switching event E3, namely the turn-off event of the residual conductive switch (here S4). Then, the positive resonant current is commutated to diode D3. After another dead-time (i.e. at timepoint t9), S2 and S3 are turned on (i.e. switching event E4) and start conducting current after the zero-crossing. The next Vc control data is adopted by the counter as a new setpoint. Countdown is again triggered by the current zero-crossing event.

The sequencing and timing of FIG. 21 will be described in more detail below.

Referring to FIG. 21, the transmitted control data Vc shall be made stable and valid at time point t0, i.e. the rising edge of the SYNC signal. In this example, at the same timepoint, the switching event E3 occurs, that is to say the second switch member (here the switch S2) of the conductive diagonal pair is turned off at the rising edge of the SYNC signal.

In some embodiments, a snubber capacitor is connected in parallel to each switch member in order to create a ZVS condition for the turn-off event. For a given switch member, the snubber capacitor in parallel connection with this switch member will conduct current during a gap between the conductive phases of the switch of the switching member and the diode of the complementary switching member. This means that the slope of the voltage rise across the turned-off switch member is reduced, and thus the turn-off switching losses. For example, during the timeperiod between time point t0 and t1, the snubber capacitor of the switch member S2 conducts the current. In other words, the time period between timepoint t0 and t1 stands for the time period after a switch has already been turned-off (here switch S2) and before the current commutates to the complementary diode (in this case D1).

In this example, at t2, namely after a short dead time (e.g. of several hundreds of nanoseconds up to a few microseconds) from timepoint t0 and thus at the rising edge of the signal at the input 2014, the control data Vc is taken over and buffered (i.e. loaded) by the counter such that the value Vc becomes valid at the output 2015 of the counter. At the same timepoint, the switching events E2 and E4 occur, that is to say that the complementary switches S1, S4 of the previously conductive diagonal pair are turned on (see A1). Both switches S1, S4 do not conduct current until timepoint t4 when the zero crossing E5 of the resonant current occurs (see A2).

Alternatively, the switching events E2 and E4 can occur at a different time. For example, in FIG. 22, the switching events E2 and E4 occur at timepoint t6 and t9, respectively.

At time point t3, namely at the falling edge of the SYNC signal (which represents the zero crossing E5 of the resonant current), the counter starts to count down.

At timepoint t4, the output of the counter becomes 0, which triggers the switching event E1, that is to say that the first switch member (here S1) of the conductive diagonal pair (here S1, S4) is turned off. The time period between timepoints t4 and t5 stands for the time period which begins when S1 is turned off and ends when the current is commutated to its complementary diode D2. In other words, it is the time period when the snubber capacitors parallel to S1 and S2 conduct the current, and the voltage across them changes. (see A3).

At timepoint t6, the switching event E2 occurs, that is the complementary switching member S2 of the previously turned off switching member S1 is turned on (see A4). The turn-on event E2 of switch member S2 at timepoint t6 may be triggered by a fixed delay time which is started at time point t4 and thus ends at time point t6. The switch S2 does not start to conduct current until the next zero crossing E5 of the resonant current at timepoint t10.

Similar to timepoint t0, at timepoint t7 (i.e. at the rising edge of the SYNC signal), the transmitted control data Vc will be made stable and valid when the switching event E3 occurs, that is the second switch member (here the switch S4) of the conductive diagonal pair is turned off (see A5).

Similar to timepoint t1, at timepoint t8, the turn-off of the switch S4 is communicated to the diode D3 of its complementary switching member after a time gap (t7 to t8) when the snubber capacitors Cs3 and Cs4 (see FIG. 1) conduct current.

Similar to timepoint t2, at timepoint t9, the control data Vc is taken over and buffered (i.e. loaded) by the counter such that the value Vc becomes valid at the output 2015 of the counter, and the switching events E2 and E4 occur, that is the complementary switch members S2 and S3 of the previously turned-off switch members S1 and S4 are turned on (see A4). The switch members S2 and S3 do not start to conduct current until the next zero crossing E5 of the resonant current at timepoint t10.

Similar to t3, at timepoint t10, the counter starts counting down again.

Since FIG. 22 differs from FIG. 21 only in terms of the occurrence of the switching events E2 and E4 as described in the above, FIG. 22 is not further described for brevity.

To make sure the switch members turned on/off prior to the zero crossing event of the resonant current, the switch members will be turned on/off on the basis of the zero crossing event, i.e. on the basis of signals relevant to the time of the zero crossing event. The trigger of the switch action of the switching members is depending on the time of the zero crossing event. Multiple embodiments of the signals relevant to the time of the zero crossing event have been described above, such as the SYNC signal, PRED signal, SIGN signal, drive signals and etc.

What has been described above includes examples of one or more embodiments. It is, of course, not possible to describe every conceivable combination of components or methodologies for the purpose of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A control circuit for controlling a resonant converter that includes a full-bridge configuration having two parallel switching branches, each of the two switching branches comprising two series-connected switch members, such that a switch member of one switching branch and a respective member of the other switching branch form a diagonal pair, the control circuit comprising:
   an output voltage controller configured for providing a voltage control signal for controlling an output voltage of the resonant converter;
   a zero crossing predictor configured for providing a zero crossing-predicting signal indicating zero crossing-predicting events of a resonant current of the resonant converter, each zero crossing-predicting event leading a respective zero crossing of the resonant current by a predetermined advancing time interval; and
   a switch encoder configured for controlling switching events of the switch members, wherein the switch encoder is configured, during each half period of a plurality of periods of the resonant current, starting from an initial state in which a diagonal pair is conductive, to:
   turn off a first switch member of the diagonal pair based on the voltage control signal;
   turn on, after the turn-off of the first switch member, a switch member in series connection with the first switch member prior to a zero crossing of the resonant current in the half period;
   turn off, after the turn-off of the first switch member, a second switch member of the diagonal pair at a zero crossing-predicting event leading to the zero crossing, based on the zero crossing-predicting signal; and
   turn on, after the turn-off of the second switch member, a switch member in series connection with the second switch member prior to the zero crossing event.

2. The control circuit of claim 1, wherein the switch encoder is further configured to turn on the switch member in series connection with the first switch member based on the zero crossing-predicting signal.

3. The control circuit of claim 1, further comprising:
a first delay unit for providing a first delayed signal indicating delayed zero crossing-predicting events, each delayed zero crossing-predicting event lagging a corresponding zero crossing-predicting event by a first predetermined delay time and being prior to a corresponding zero crossing of the resonant current;
wherein the switch encoder is further configured to turn off the switch member in series connection with the second switch member at a delayed zero crossing-predicting event based on the first delayed signal.

4. The control circuit of claim 3, wherein the first delay unit is configured to provide the first delayed signal by delaying the zero crossing-predicting signal.

5. The control circuit of claim 3, wherein the switch encoder is further configured to turn on the switch member in series connection with the first switch member at a delayed zero crossing predicting event based on the first delayed signal.

6. The control circuit of claim 1, further comprising:
a second delay unit for providing a second delayed signal indicating events which lag the turn-off of the first switch member by a second predetermined delay time and which are prior to the zero crossing event;
wherein the switch encoder is further configured to turn on the switch member in series connection with the first switch member based on the second delayed signal.

7. The control circuit of claim 6, wherein the second delay unit is configured to provide the second delayed signal by delaying the voltage control signal.

8. The control circuit of claim 1, wherein the switch member turned off first on the basis of the voltage control signal in a first period of the resonant current is different from the switch member turned off first on the basis of the voltage control signal in a second period of the resonant current.

9. The control circuit of claim 1, wherein the switch encoder comprises:
a synchronous sawtooth generator for providing a sawtooth signal based on the zero crossing-predicting signal;
a comparator for providing a phase signal based on the voltage control signal and the sawtooth signal; and
a digital encoder for providing a drive signal for each switch member based on of the phase signal.

10. The control circuit of claim 1, wherein the switch encoder comprises:
a zero crossing predictor for providing a synchronizing signal based on the zero crossing-predicting signal and the zero crossings of the resonant current;
a counter for providing a phase signal based on the voltage control signal and the synchronizing signal; and
a digital encoder for providing a drive signal for each switch member based on of the phase signal.

11. A method of controlling a resonant converter, comprising:
providing a full-bridge configuration having two parallel switching branches, each of the two switching branches comprising two series-connected switch members, such that a switch member of one switching branch and a respective member of the other switching branch form a diagonal pair;
providing a voltage control signal for controlling an output voltage of the resonant converter;
providing a zero crossing-predicting signal indicating zero crossing-predicting events of a resonant current of the resonant converter, each zero crossing-predicting event leading a respective zero crossing of the resonant current by a predetermined advancing time interval;
during each half period of a plurality of periods of the resonant current, starting from an initial state in which a diagonal pair is conductive, turning off a first switch member of the diagonal pair based on the voltage control signal;
turning on, after the turn-off of the first switch member, a switch member in series connection with the first switch member prior to a zero crossing of the resonant current in the half period;
turning off, after the turn-off of the first switch member, a second switch member of the diagonal pair at a zero crossing-redicting event leading to the zero crossing based on the zero crossing-predicting signal; and
turning on, after the turn-off of the second switch member, a switch member in series connection with the second switch member prior to the zero crossing event.

12. A power inverter, comprising:
a resonant converter comprising:
a full-bridge configuration having two parallel switching branches, each of the two switching branches comprising two series-connected switch members, such that a switch member of one switching branch and a respective member of the other switching branch form a diagonal pair; and
a resonant circuit connected between junctions of the two series-connected switch members of each of the two switching branches; and
a control circuit configured for controlling the resonant converter, comprising:
an output voltage controller configured for providing a voltage control signal for controlling an output voltage of the resonant converter;
a zero crossing predictor configured for providing a zero crossing-predicting signal indicating zero crossing-predicting events of a resonant current of the resonant converter, each zero crossing-predicting event leading a respective zero crossing of the resonant current by a predetermined advancing time interval;
a switch encoder configured for controlling switching events of the switch members, wherein the switch encoder is configured, during each half period of a plurality of periods of the resonant current, starting from an initial state in which a diagonal pair is conductive, to:
turn off a first switch member of the diagonal pair based on the voltage control signal;
turn on, after the turn-off of the first switch member, a switch member in series connection with the first switch member prior to a zero crossing of the resonant current in the half period;
turn off, after the turn-off of the first switch member, a second switch member of the diagonal pair at a zero crossing-predicting event leading to the zero crossing, based on the zero crossing-predicting signal; and
turn on, after the turn-off of the second switch member, a switch member in series connection with the second switch member prior to the zero crossing event.

13. The power inverter of claim 12, wherein at least one of the switch members is connected in parallel to a snubber capacitor.

14. An x-ray generator, comprising:
- a power inverter comprising:
  - a resonant converter comprising:
    - a full-bridge configuration having two parallel switching branches, each of the two switching branches comprising two series-connected switch members, such that a switch member of one switching branch and a respective member of the other switching branch form a diagonal pair; and
    - a resonant circuit connected between junctions of the two series-connected switch members of each of the two switching branches; and
  - a control circuit configured for controlling the resonant converter, comprising:
    - an output voltage controller configured for providing a voltage control signal for controlling an output voltage of the resonant converter;
    - a zero crossing predictor configured for providing a zero crossing-predicting signal indicating zero crossing-predicting events of a resonant current of the resonant converter, each zero crossing-predicting event leading a respective zero crossing of the resonant current by a predetermined advancing time interval;
    - a switch encoder configured for controlling switching events of the switch members, wherein the switch encoder is configured, during each half period of a plurality of periods of the resonant current, starting from an initial state in which a diagonal pair is conductive, to:
      - turn off a first switch member of the diagonal pair based on the voltage control signal;
      - turn on, after the turn-off of the first switch member, a switch member in series connection with the first switch member prior to a zero crossing of the resonant current in the half period;
      - turn off, after the turn-off of the first switch member, a second switch member of the diagonal pair at a zero crossing-predicting event leading to the zero crossing, based on the zero crossing-predicting signal; and
      - turn on, after the turn-off of the second switch member, a switch member in series connection with the second switch member prior to the zero crossing event;
- a DC voltage source connected to an input of the power inverter; and
- an x-ray tube connected to an output of the power inverter.

* * * * *